(12) United States Patent
Wang et al.

(10) Patent No.: US 12,417,149 B2
(45) Date of Patent: Sep. 16, 2025

(54) SERVICE CLUSTER INSTANCE BACKUP AND RECOVERY METHODS AND RELATED DEVICES

(71) Applicant: TENCENT TECHNOLOGY (SHENZHEN) COMPANY LIMITED, Shenzhen (CN)

(72) Inventors: Cheng Wang, Shenzhen (CN); Lei Peng, Shenzhen (CN); Yongfu Sun, Shenzhen (CN); Chuan Du, Shenzhen (CN); Jue Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 23 days.

(21) Appl. No.: 18/588,833

(22) Filed: Feb. 27, 2024

(65) Prior Publication Data

US 2024/0202077 A1 Jun. 20, 2024

Related U.S. Application Data

(63) Continuation of application No. PCT/CN2023/117413, filed on Sep. 7, 2023.

(30) Foreign Application Priority Data

Oct. 12, 2022 (CN) .......................... 202211247839.6

(51) Int. Cl.
 *G06F 12/00* (2006.01)
 *G06F 11/14* (2006.01)
(52) U.S. Cl.
 CPC .................. *G06F 11/1458* (2013.01)
(58) Field of Classification Search
 CPC ............. G06F 11/1458; G06F 11/1446; G06F 3/0646; G06F 3/0683
 See application file for complete search history.

(56) References Cited

U.S. PATENT DOCUMENTS

| 11,194,483 B1* | 12/2021 | Dontu | G06F 3/067 |
| 2021/0200814 A1 | 7/2021 | Tai et al. | |
| 2023/0082186 A1* | 3/2023 | Balcha | G06F 11/2094 |
| | | | 714/4.11 |

FOREIGN PATENT DOCUMENTS

| CN | 111338854 A | 6/2020 |
| CN | 113296871 A | 8/2021 |
| CN | 113946276 A | 1/2022 |

OTHER PUBLICATIONS

The World Intellectual Property Organization (WIPO) International Search Report for PCT/CN2023/117413 Nov. 20, 2023 6 Pages (including translation).

(Continued)

*Primary Examiner* — Shawn X Gu
(74) *Attorney, Agent, or Firm* — Anova Law Group, PLLC

(57) ABSTRACT

Service cluster instance backup and recovery methods and related devices are disclosed. For a container group in a service cluster instance to be backed up, a source persistent volume claim and a source persistent volume object corresponding to the container group may be set, and the container group is stored based on the source persistent volume object. When the service cluster instance satisfies a backup triggering condition, for the container group, a backup persistent volume claim and a backup persistent volume object of the container group are created according to the source persistent volume claim and the source persistent volume object corresponding to the container group. To-be-backed-up data of the container group is acquired based on the source persistent volume object. The to-be-backed-up data is backed up to a storage area pointed by the backup persistent volume object according to the backup persistent volume claim of the container group.

20 Claims, 10 Drawing Sheets

(56) References Cited

OTHER PUBLICATIONS

Zhi Tian, "Getting Started from scratch K8s | Application Storage and Persistence of Data Volumes: Storage Snapshots and Topology Scheduling", https://developer.aliyun.com/article/720355, on Oct. 10, 2019 (Oct. 10, 2019), Text sections 1 to 4.
Persistent Volumes—Kubernets. https://kubernetes.io/docs/concepts/storage/persistent-volumes/ 20 pages.
Volume Snapshots _ Kubernetes. https://kubernetes.io/docs/concepts/storage/volume-snapshots/ 5 pages.
Extend Kubernetes _ Kubernetes. https://kubernetes.io/docs/tasks/extend-kubernetes/ 1 page.
Snapshot principle. https://cloud.tencent.com/document/product/362/32978 4 pages.

* cited by examiner

SERVICE CLUSTER INSTANCE BACKUP AND RECOVERY METHODS AND RELATED DEVICES

CROSS-REFERENCES TO RELATED APPLICATIONS

This application is a continuation application of PCT Patent Application No. PCT/CN2023/117413, filed on Sep. 7, 2023, which claims priority to Chinese Patent Application No. 2022112478396, entitled "SERVICE CLUSTER INSTANCE BACKUP AND RECOVERY METHODS AND RELATED DEVICES" filed with the China National Intellectual Property Administration on Oct. 12, 2022, both of which are incorporated by reference in their entirety.

FIELD OF THE TECHNOLOGY

The present disclosure relates to the field of computer technologies, and specifically to service cluster instance backup and recovery technologies.

BACKGROUND OF THE DISCLOSURE

Kubernetes is an open source container orchestration engine, which supports automated deployment, large scalability, and application container management. A Kubernetes cluster may include at least one container group, and an application instance may be operated in the container group. To ensure persistence, recoverability, and high availability of data storage, disaster recovery backup should be achieved to a certain extent for data in a Kubernetes cluster.

Currently, the entire backup of a service cluster instance in a database is not available, the backup efficiency is low, and rapid backup of the service cluster instance is not realized.

SUMMARY

Embodiments of the present disclosure provide service cluster instance backup and recovery methods and related devices. The related devices may include service cluster instance backup and recovery apparatuses, an electronic device, a computer-readable storage medium, and a computer program product, which may back up the entire service cluster instance, thereby improving the backup efficiency of the service cluster instance, and facilitating rapid backup of the service cluster instance.

This embodiment of the present disclosure provides a service cluster instance backup method, performed by an electronic device. The method includes: determining a service cluster instance to be backed up, the service cluster instance including at least one container group; for one container group in the service cluster instance: setting, for the container group, a source persistent volume claim and a source persistent volume object corresponding to the container group, and storing the container group based on the source persistent volume object, the source persistent volume claim being configured to claim storage attribute information required by the container group, and the source persistent volume object pointing to a data storage area of the container group; creating, for the container group, a backup persistent volume claim and a backup persistent volume object corresponding to the container group according to the source persistent volume claim and the source persistent volume object corresponding to the container group when the service cluster instance satisfies a backup triggering condition; acquiring, for the container group, target data of the container group to be backed up based on the source persistent volume object corresponding to the container group; and backing up, for the container group, the target data of the container group to a storage area pointed by the backup persistent volume object corresponding to the container group according to the backup persistent volume claim corresponding to the container group.

This embodiment of the present disclosure provides a service cluster instance recovery method, performed by an electronic device. The method includes: acquiring, when an instance recovery request for a service cluster instance is received, backup data of a container group in the service cluster instance; creating a target backup persistent volume claim and a target backup persistent volume object corresponding to the container group according to the backup data of the container group, the target backup persistent volume claim being configured to claim storage attribute information required by the container group, and the target backup persistent volume object pointing to a storage area for the backup data of the container group; creating a target persistent volume claim and a target persistent volume object corresponding to the container group according to the target backup persistent volume claim and the target backup persistent volume object corresponding to the container group; and operating the container group according to the target persistent volume claim and the target persistent volume object corresponding to the container group.

Correspondingly, this embodiment of the present disclosure provides a service cluster instance backup apparatus, including: a determination unit, configured to determine a to-be-backed-up service cluster instance, the service cluster instance including at least one container group; a storage unit, configured to set, for each container group, a source persistent volume claim and a source persistent volume object corresponding to the container group, and store the container group based on the source persistent volume object, the source persistent volume claim being configured to claim storage attribute information required by the container group, and the source persistent volume object pointing to a data storage area of the container group; a first creation unit, configured to create, for each container group, a backup persistent volume claim and a backup persistent volume object corresponding to the container group according to the source persistent volume claim and the source persistent volume object corresponding to the container group when the service cluster instance satisfies a backup triggering condition; a first acquisition unit, configured to acquire, for each container group, to-be-backed-up data of the container group based on the source persistent volume object corresponding to the container group; and a backup unit, configured to back up, for each container group, the to-be-backed-up data of the container group to a storage area pointed by the backup persistent volume object corresponding to the container group according to the backup persistent volume claim corresponding to the container group.

Correspondingly, this embodiment of the present disclosure provides a service cluster instance recovery apparatus, including: a second acquisition unit, configured to acquire, when an instance recovery request for a service cluster instance is received, backup data of each container group in the service cluster instance; a second creation unit, configured to create, for each container group, a target backup persistent volume claim and a target backup persistent volume object corresponding to the container group according to the backup data of the container group, the target backup persistent volume claim being configured to claim storage attribute information required by the container group, and the target backup persistent volume object pointing to a storage area for the backup data of the container group; a third creation unit, configured to create, for each container group, a target persistent volume claim and a target persistent volume object corresponding to the container group according to the target backup persistent volume claim and the target backup persistent volume object corresponding to the container group; and an operation unit, configured to operate the container group according to the target persistent volume claim and the target persistent volume object corresponding to the container group.

This embodiment of the present disclosure provides an electronic device, including a processor and a memory. The memory stores a plurality of instructions, and the processor loads the instructions to perform the steps of the service cluster instance backup and recovery methods provided by this embodiment of the present disclosure.

This embodiment of the present disclosure further provides a computer-readable storage medium on which a computer program is stored. The computer program, when executed by a processor, implements the steps of the service cluster instance backup and recovery methods provided by this embodiment of the present disclosure.

This embodiment of the present disclosure further provides a non-transitory computer storage medium, including computer programs or instructions. The computer programs or instructions, when executed by a processor, implement the steps of the service cluster instance backup and recovery methods provided by this embodiment of the present disclosure.

This embodiment of the present disclosure provides service cluster instance backup and recovery methods and related devices. A to-be-backed-up service cluster instance may be determined, where the service cluster instance includes at least one container group. For each container group, a source persistent volume claim and a source persistent volume object corresponding to the container group are set, and the container group is stored based on the source persistent volume object, where the source persistent volume claim is configured to claim storage attribute information required by the container group, and the source persistent volume object points to a data storage area of the container group. When the service cluster instance satisfies a backup triggering condition, for each container group, a backup persistent volume claim and a backup persistent volume object corresponding to the container group are created according to the source persistent volume claim and the source persistent volume object corresponding to the container group. For each container group, to-be-backed-up data of the container group is acquired based on the source persistent volume object corresponding to the container group. For each container group, the to-be-backed-up data of the container group is backed up to a storage area pointed by the backup persistent volume object corresponding to the container group according to the backup persistent volume claim corresponding to the container group, so as to realize data backup of each container group in the service cluster instance. According to the present disclosure, through the foregoing manner, when a service cluster instance is backed up, a corresponding backup persistent volume claim and backup persistent volume object are created for each container group, and to-be-backed-up data of the container group is acquired from a source persistent volume object corresponding to the container group. Then, the to-be-backed-up data of the container group is backed up to a storage area pointing to the backup persistent volume object according to the backup persistent volume claim. In this way, data backup of each container group in the service cluster instance is realized, whereby the entire service cluster instance is backed up, thereby improving the backup efficiency of the service cluster instance, and facilitating rapid backup of the service cluster instance.

DESCRIPTION OF EMBODIMENTS

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure.

This embodiment of the present disclosure provides service cluster instance backup and recovery methods and related devices. The related devices may include service cluster instance backup and recovery apparatuses, an electronic device, a computer-readable storage medium, and a computer program product.

Specifically, this embodiment of the present disclosure provides a service cluster instance backup apparatus suitable for a first electronic device. The first electronic device may be a server or another device. This embodiment of the present disclosure further provides a service cluster instance recovery apparatus suitable for a second electronic device. The second electronic device may be a server or another device.

Figure 1A:
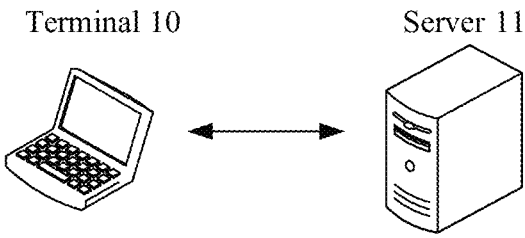
FIG. 1a is a schematic scenario diagram of service cluster instance backup and recovery methods according to an embodiment of the present disclosure.

As shown in FIG. 1a, the service cluster instance backup and recovery methods are, for example, performed cooperatively by a terminal and a server. A service cluster instance backup and recovery system provided by this embodiment of the present disclosure includes a terminal 10, a server 11, and the like. The terminal 10 is connected to the server 11 through a network, for example, a wired or wireless network. The service cluster instance backup and recovery apparatuses may be integrated in the server.

In one embodiment, the server 11 may be configured to: determine a to-be-backed-up service cluster instance, where the service cluster instance includes at least one container group; set, for each container group, a source persistent volume claim and a source persistent volume object corresponding to the container group, and store the container group based on the source persistent volume object, where the source persistent volume claim is configured to claim storage attribute information required by the container group, and the source persistent volume object points to a data storage area of the container group; create, for each container group, a backup persistent volume claim and a backup persistent volume object corresponding to the container group according to the source persistent volume claim and the source persistent volume object corresponding to the container group when the service cluster instance satisfies a backup triggering condition; acquire, for each container group, to-be-backed-up data of the container group based on the source persistent volume object corresponding to the container group; and back up, for each container group, the to-be-backed-up data of the container group to a storage area pointed by the backup persistent volume object corresponding to the container group according to the backup persistent volume claim corresponding to the container group, thus realizing data backup of each container group in the service cluster instance.

The server 11 may be an independent physical server, a server cluster or a distributed system composed of a plurality of physical servers, or a cloud server providing basic cloud computing services, such as a cloud service, a cloud database, cloud computing, a cloud function, cloud storage, a network service, cloud communication, a middleware service, a domain name service, a security service, a content delivery network (CDN), and big data and artificial intelligence platforms. The service cluster instance backup and recovery methods or apparatuses disclosed in the present disclosure may be applied to a plurality of servers. The plurality of servers may form a blockchain, and the servers are nodes on the blockchain.

The terminal 10 may be configured to transmit a data backup instruction for the service cluster instance to the server 11, whereby the server 11 realizes data backup of each container group in the service cluster instance based on the data backup instruction. The terminal 10 may include a mobile phone, an intelligent voice interaction device, a smart home appliance, a vehicle terminal, an aircraft, a tablet computer, a laptop, or a personal computer (PC), and the like. The terminal 10 may be further provided with a client. The client may be an application client, a browser client, or the like.

In another embodiment, the server 11 may be configured to: acquire, when an instance recovery request for a service cluster instance is received, backup data of each container group in the service cluster instance; create, for each container group, a target backup persistent volume claim and a target backup persistent volume object corresponding to the container group according to the backup data of the container group, where the target backup persistent volume claim is configured to claim storage attribute information required by the container group, and the target backup persistent volume object points to a storage area for the backup data of the container group; create, for each container group, a target persistent volume claim and a target persistent volume object corresponding to the container group according to the target backup persistent volume claim and the target backup persistent volume object corresponding to the container group; and operate the container group according to the target persistent volume claim and the target persistent volume object corresponding to the container group, so as to recover operation of each container group in the service cluster instance.

The terminal 10 may be configured to transmit an instance recovery request for the service cluster instance to the server 11 according to server requirements, whereby the server 11 recovers operation of each container group in the service cluster instance based on the instance recovery request.

The service cluster instance backup and recovery methods provided by this embodiment of the present disclosure relate to a direction of cloud storage and database in the field of cloud technology. This embodiment may be applied to various scenarios such as cloud technology, artificial intelligence, intelligent transportation, and assisted driving.

This embodiment is described from the perspective of a service cluster instance backup apparatus. The service cluster instance backup apparatus may be specifically integrated in a first electronic device. The first electronic device may be a server or a terminal. The order of description of the following embodiments is not intended to limit preference orders of the embodiments.

Figure 1B:
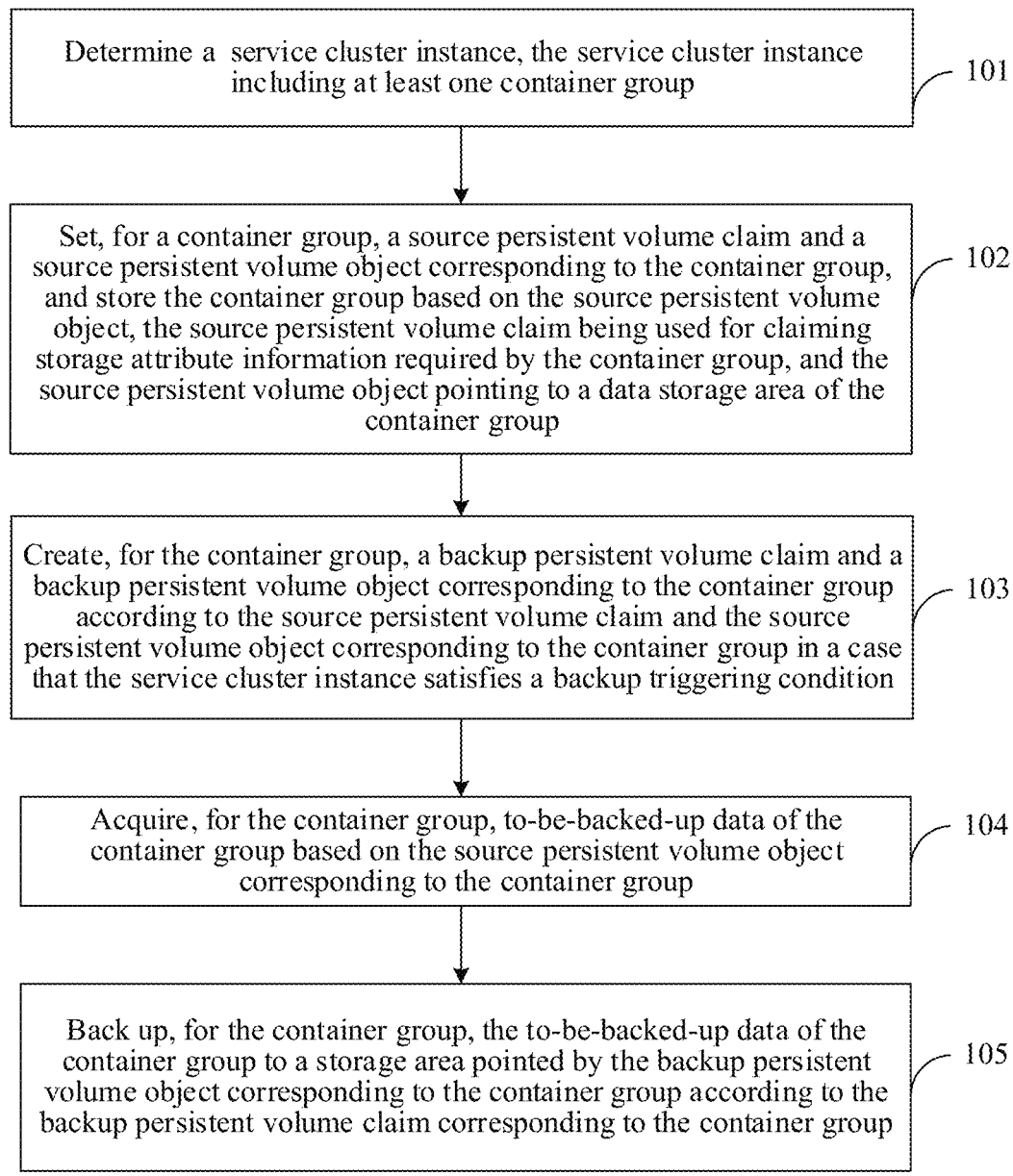
FIG. 1b is a flowchart of service cluster instance backup and recovery methods according to an embodiment of the present disclosure.

As shown in FIG. 1b, a specific procedure of the service cluster instance backup method may be as follows:

101: Determine a service cluster instance to be backed up, the service cluster instance including at least one container group. Hereinafter, steps 102-105 are described for one container group, it can be understood that the steps can be performed for each container group in the service cluster instance. Hereinafter, certain operation(s) may be described for each container group in the service cluster instance, it can be understood that such operation(s) may be performed for one or more container groups in the service cluster instance, and other operations may be performed for other container groups in service cluster instance.

The service cluster instance may be a cluster instance delivered from a stateful service (database), which may be denoted as Cluster. The cluster may be a cluster composed of a plurality of containers. The cluster may be a cluster for container management based on a container orchestration engine Kubernetes (K8s). The container orchestration engine may be configured to manage containerized applications on a plurality of hosts in a cloud platform.

Kubernetes is an open source system for automatically deploying, scaling, and managing containerized applications, which may realize the functions of combining a plurality of containers into one service and dynamically allocating hosts to support container operation.

Figure 1C:
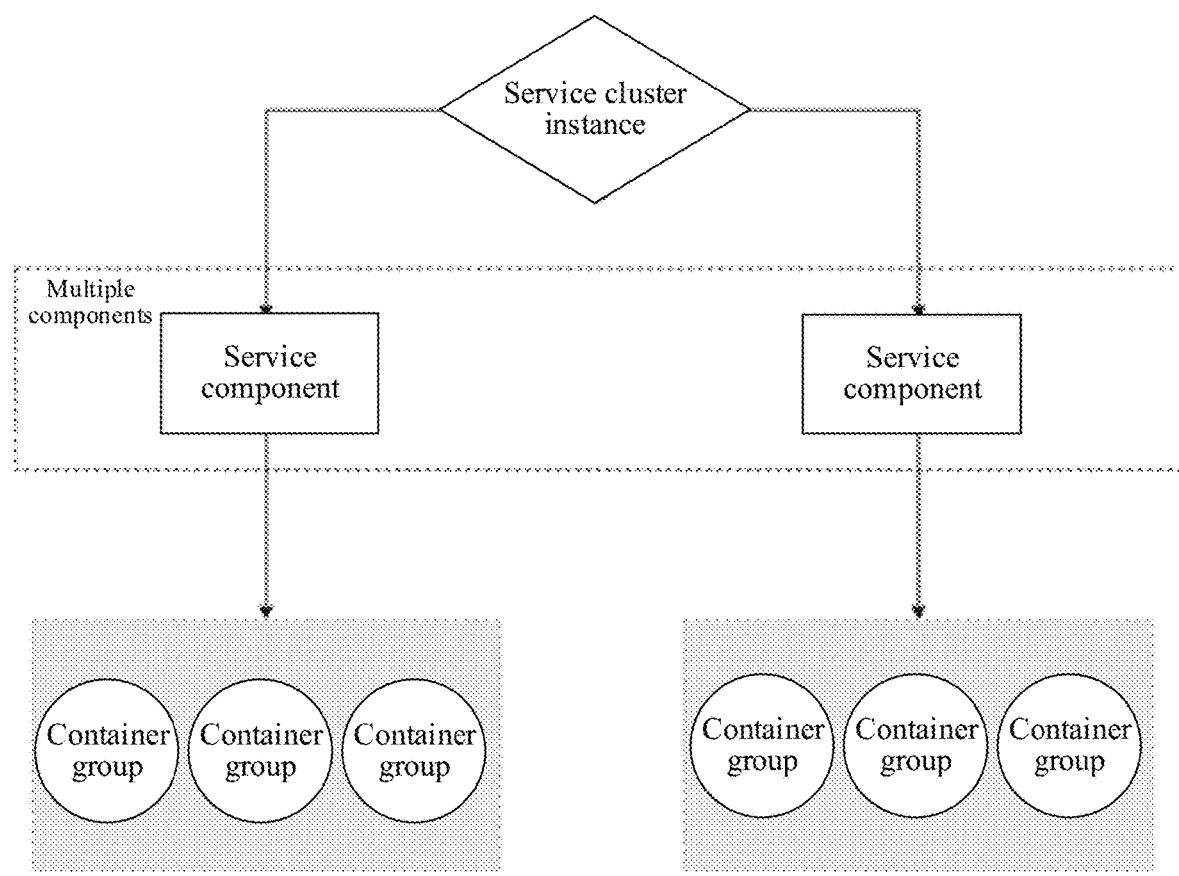
FIG. 1c is an explanatory diagram of service cluster instance backup and recovery methods according to an embodiment of the present disclosure.

Specifically, the service cluster instance may include at least one service component, and each service component may include at least one container group. As shown in FIG. 1c, the service cluster instance may be abstracted into a three-layer resource management model, including cluster, set, and pod from top to bottom, where cluster corresponds to a service instance, set corresponds to a service component, and pod corresponds to a container group. For example, for a LibraDB product, the cluster instance is tdach-xxx, set includes zookeeper and clickhouse, and pod includes zookeeper pods and clickhouse-pods respectively, thereby meeting resource management requirements of database products. Through this resource management model, access of various service products may also be supported, and a starting order of service components, custom configuration of parameters of each service component, service pod shards, replicas, and other characteristics are supported.

LibraDB is a distributed hybrid transaction and analytical process (HTAP) database, which is based on pluggable engine design, powerful data fusion capability, and cloud native system architecture, and may provide users with an integrated product experience. ZooKeeper is a distributed open source distributed application coordination service, and clickhouse is a column database management system for online analysis.

The container group may be a container group responsible for the deployment of a service component in the service cluster instance. Each container group may include at least one container. Specifically, a container group (pod) may be a basic scheduling unit of Kubernetes, and a container group pod may include a plurality of service processes.

The container is an executable unit of software, where an application code is packaged together with libraries and dependencies in a common way. By isolating processes and controlling the amount of central processing unit (CPU), memory and disk accessible by these processes, the container allows a plurality of applications to share an operating system in the form of operating system virtualization.

102: Set, for the container group, a source persistent volume claim and a source persistent volume object corresponding to the container group, and store the container group based on the source persistent volume object, the source persistent volume claim claiming storage attribute information required by the container group, and the source persistent volume object pointing to a data storage area of the container group.

The source persistent volume claim may be an application for storage resources, which represents an underlying storage object abstracted for Pod use, and claims a required storage capacity (such as 100 G), Node exclusive or shared, file system or block device, or the like, which may be denoted as a persistent volume claim (PVC). Specifically, PVC is a resource demand application transmitted by users to the kubernetes system.

The storage attribute information required by the container group claimed by the source persistent volume claim may include a storage capacity, a file system type, and the like. This embodiment is not limited thereto.

The source persistent volume object is an abstraction of storage resources, which represents storage abstraction of an underlying hard disk and is associated with a real hard disk. The source persistent volume object may be denoted as a persistent volume (PV), namely, a persistent volume content.

The persistent volume herein is a cluster resource, which may be abstraction of an actual physical storage system in K8s. The persistent volume may be understood as a file system or block device that can be mounted inside a container, and corresponds to two working modes: Filesystem and Block.

Specifically, when the container group pod needs to use storage resources, it is necessary to refer to a volume of a PVC type in the definition of Volume and mount the PVC to a certain path in the container for use. After the PVC is mounted, the pod can use the storage resources. The same PVC may be mounted and used by a plurality of pods at the same time. In this case, the application shall deal with the problem of a plurality of processes accessing the same storage.

In this embodiment, a PVC corresponding to a container group may be set, a PV set currently in an available state (namely, a persistent volume object set) is determined, and then a PV matching configuration information of the PVC is selected from the PV set currently in the available state. That is, a plurality of PVs is preliminarily screened according to the configuration information of the PVC, whereby the PV that does not satisfy PVC conditions may be filtered out, thus avoiding the binding failure of the PV and the PVC, providing an accurate PV binding object for the PVC, and then establishing a binding relationship between the PVC and the selected PV.

The configuration information of the PVC may include, but is not limited to, a name, a binding state, a storage volume name, a storage space, an access mode, a storage type, and the like.

In one embodiment the step of setting, for the container group, a source persistent volume claim and a source persistent volume object corresponding to the container group and storing the container group based on the source persistent volume object may include:

setting, for the container group, a source persistent volume claim corresponding to the container group, the source persistent volume claim including a storage capacity and a file system type required by the container group;

selecting a persistent volume object matching the storage capacity and the file system type from a persistent volume object set currently in an available state as a source persistent volume object corresponding to the container group, and establishing a binding relationship between the selected source persistent volume object and the source persistent volume claim; and storing data of the container group to the data storage area pointed by the source persistent volume object according to the source persistent volume claim and the binding relationship.

The available state may specifically refer to a state that has not been bound by the PVC. The persistent volume object set includes at least one persistent volume object that is currently in the available state.

The establishing a binding relationship between the source persistent volume object and the source persistent volume claim may specifically be writing an object attribute identity of the source persistent volume object into configuration information of the source persistent volume claim. According to the binding relationship and the source persistent volume claim, the source persistent volume object corresponding to the source persistent volume claim may be determined, thus storing data of the container group to the data storage area pointed by the source persistent volume object.

In one embodiment, K8s provides two resource types: a persistent volume object PV and a persistent volume claim PVC to meet the requirements of container data persistence.

Each PV may correspond to a storage space, such as a storage volume Volume on the server. The container belongs to a resource in K8s. The container resource specifies the PVC to be used in own configuration, and the specified PVC specifies storage resource configuration information such as a storage size and a storage mode to be used in own configuration. Finally, K8s pairs in the current kubernetes system according to the storage resource configuration information. If there is a PV that meets the claim requirements in the storage resource configuration information of the PVC, the PV may be bound with the PVC.

Specifically, the database is a typical application of a cloud native stateful service, which has high requirements for efficient access and persistent storage of data. The persistent storage of data is generally realized by the PV. By specifying the corresponding PVC in pod and calling an underlying container storage interface (CSI) plug-in, the dynamic plugging, formatting, and mounting of a cloud hard disk may be realized. In this way, Container (container) in pod may use the corresponding mounted disk directory.

CSI is an interface standard for container storage configuration defined by K8s. The standard defines interfaces for creating persistent volumes, deleting persistent volumes, and snapshots. Any storage that implements CSI specification may be used as back-end storage of K8s. In K8s, the function of storing snapshots may be realized by a CSI snapshotter controller.

Figure 1D:
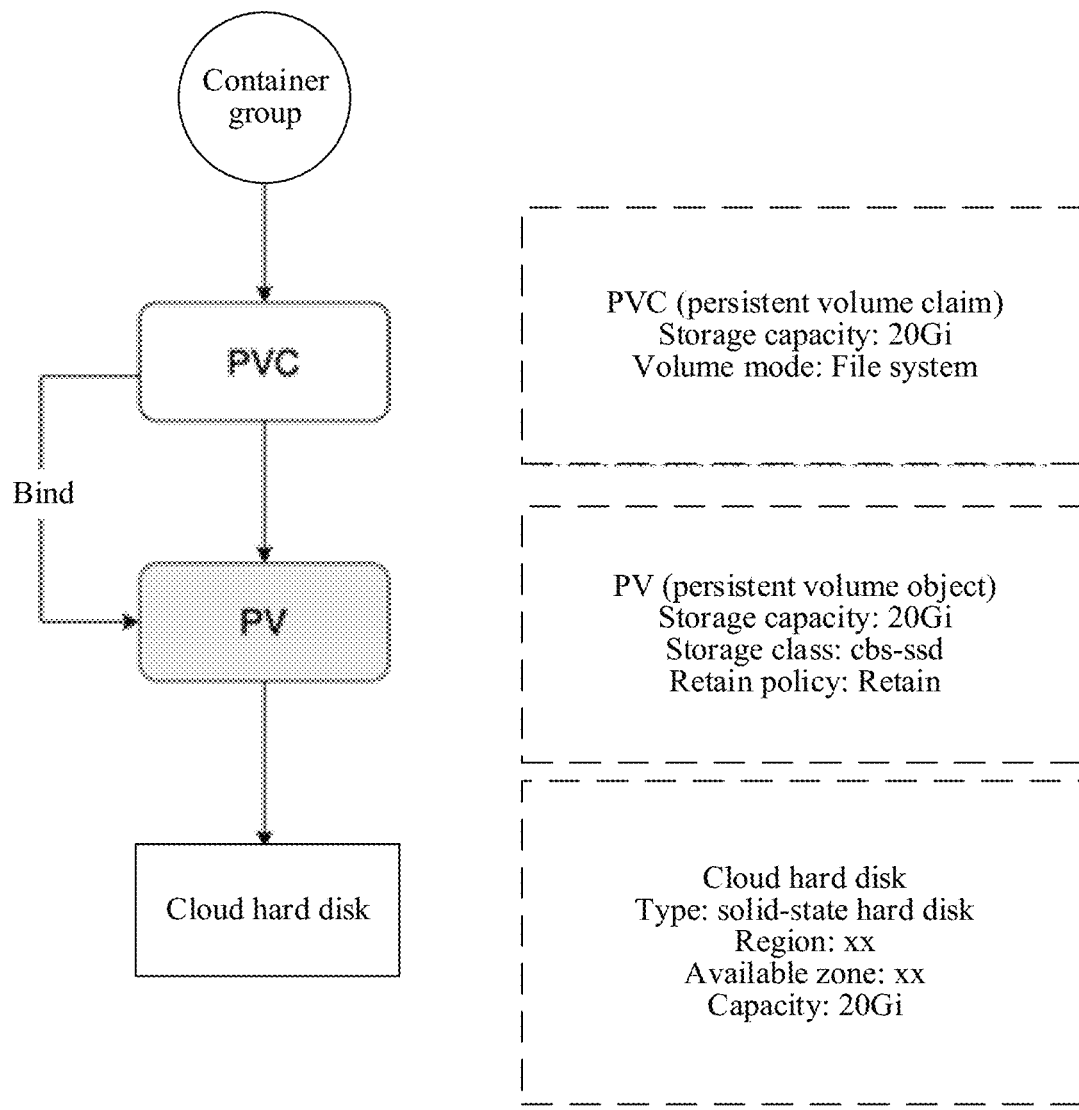
FIG. 1d is another explanatory diagram of service cluster instance backup and recovery methods according to an embodiment of the present disclosure.

Referring to FIG. 1d, each container group pod will set a PVC to claim the required storage attribute information, such as a storage capacity and a volume mode. For example, the required storage capacity may be claimed as 20 Gi and the volume mode may be claimed as Filesystem. After setting the PVC, the underlying CSI plug-in may implement a specific PV persistent storage implementation. The attribute information of the PV may include a storage capacity (for example, 20 Gi), a storage type (for example, cbs-ssd), a reclaim policy, and the like.

The underlying PV is associated with a real hard disk (specifically, cloud hard disk) system. The attribute information of Disk may include a region, an available zone, a disk capacity (for example, 20 Gi), a type (for example, solid-state hard disk SSD), and the like. The use of the hard disk will be charged according to cloud service standards, for example, charged yearly and monthly, or by volume.

The reclaim policy may be a retain policy. The retain policy means that the corresponding PV will be retained when the PVC is deleted. A storage class (SC) may be used for dividing different specifications, hard disk performance, and the like into specific classes for services as demanded, and the cost is controlled flexibly.

The storage resources (PV and PVC) are independently managed resources relative to the container group (pod) and may be deleted separately. When performing the operation of deleting resources, the system will detect whether the storage resources are currently being used. If the resources are still used, the deletion of related resources will be postponed until the resources are not used, thereby ensuring that data will not be lost since the resources are not directly deleted when being used.

Specifically, users may delete the PVC after using the storage resources. A PV bound to the PVC will be marked as "released", but cannot be immediately bound to another PVC, because data written through the previous PVC may still be retained on the storage device, and the PV can only be used again after clearing the data. Administrators may set a resource reclaim policy for the PV.

In some embodiments, the resource reclaim policy for the PV may be set to a retain policy. The retain policy means that after deleting the PVC, the PV bound thereto will not be deleted, but will only be marked as released. Therefore, the data in the PV still exists and cannot be used by a new PVC before wiping, and the data needs to be cleaned by administrators before continuing to use. The cleaning steps may be as follows:

(1) Delete a resource object of a PV, where data in a back-end storage asset of some external storage provider associated with the PV still exists.

(2) Manually clean the data in the back-end storage asset of the PV.

(3) Manually delete the back-end storage asset. If the storage asset needs to be reused, a new PV may be created to be associated therewith.

In this embodiment, the container group pod accesses the PV by using the PVC, pod needs to be in the same namespace as the PVC, the PVC will be bound to an appropriate PV in a cluster, and the PV will be mounted on Pod.

103: Create, for the container group, a backup persistent volume claim and a backup persistent volume object corresponding to the container group according to the source persistent volume claim and the source persistent volume object corresponding to the container group when the service cluster instance satisfies a backup triggering condition.

The backup triggering condition is also a condition for triggering a snapshot of the service cluster instance, which may be set according to actual situations. This embodiment is not limited thereto. For example, the backup triggering condition may be that the service cluster instance is deleted, or a current time satisfies a backup triggering time condition of the service cluster instance, or the like.

The snapshot, also known as Snapshot, is a common service for stored data volumes, may be configured to record a data content state of the stored data volumes at a certain time point in the past, and can recover to the data content state at a specified time point after the stored data volumes are damaged or the data is written incorrectly, which is of great significance for the protection of data content.

Specifically, a user database stateful service may be fully snapshot regularly according to service requirements or fully snapshot automatically in a case of careless deletion, so as to rapidly recover the normal operation of the data and the service cluster instance.

In this embodiment, the backup persistent volume claim is also a persistent volume snapshot claim, which represents an abstract resource object of a persistent volume snapshot, and may be denoted as volume snapshot (VSS).

The backup persistent volume object is also a persistent volume snapshot content, which represents an abstract resource object of a persistent volume snapshot content and is associated with real back-end snapshot storage resources, such as COS/NFS. The backup persistent volume object may be denoted as a volume snapshot content (VSC).

Cloud object storage (COS) is a cloud object storage service, which is a distributed and massive access system of unstructured objects. A network file system (NFS) is a network file system, which is a distributed and massive access system.

In one embodiment the step of creating, for a container group, a backup persistent volume claim and a backup persistent volume object corresponding to the container group according to the source persistent volume claim and the source persistent volume object corresponding to the container group when the service cluster instance satisfies a backup triggering condition may include:

creating, for a container group, a backup persistent volume claim and a backup persistent volume object corresponding to the container group according to the source persistent volume claim and the source persistent volume object corresponding to the container group in response to that the service cluster instance is deleted and in a backup starting state.

The backup triggering condition may be that the service cluster instance is deleted and in a backup starting state. The backup starting state may specifically mean that a snapshot switch of the service cluster instance is on.

Specifically, in Cluster Preset of each service product, the snapshot switch may be controlled by setting a disable Snapshot parameter to true/false, or if a switch value is not set, the snapshot switch will be turned on by default.

After the service cluster instance of the user is destroyed and the snapshot switch is on, the service cluster instance backup apparatus provided by the present disclosure automatically creates a snapshot for backup, specifically including the backup of disk persistent volume data and sub-resource metadata.

Cluster Preset is a service cluster instance template, which specifically represents a specification template pre-configured in advance by the service cluster instance. For example, the specification template pre-configured in advance may include image (mirror), cpu/memory (processor/memory), parameter configuration, and the like of corresponding components.

After in-depth analysis of usage scenarios of production practice, it is found that the demand for generating snapshots for stored data volumes often has the characteristics of timing and cycle, such as usually generating snapshots at 2 o'clock every night, and then generating snapshots at 2 o'clock at night every weekend. Therefore, the present disclosure may further provide another technical solution for automatic snapshot generation. That is, an application administrator may automatically manage a snapshot generation process of designated stored data volumes by setting a snapshot time in advance.

In one embodiment the step of creating, for a container group, a backup persistent volume claim and a backup persistent volume object corresponding to the container group according to the source persistent volume claim and the source persistent volume object corresponding to the container group when the service cluster instance satisfies a backup triggering condition may include:

creating, for the container group, a backup persistent volume claim and a backup persistent volume object corresponding to the container group according to the source persistent volume claim and the source persistent volume object corresponding to the container group when a current time satisfies a backup triggering time condition of the service cluster instance.

The backup triggering time condition may be set according to actual situations. This embodiment is not limited thereto. For example, the backup triggering time condition may be set to take a snapshot at 02:00 every day.

Specifically, a user may set a timing snapshot policy. For example, the timing snapshot policy be backup once every hour or at 02:00 every morning. After the timing snapshot policy is set, the service cluster instance backup apparatus will perform regular snapshot backup according to a time policy specified by the user.

104: Acquire, for the container group, target data of the container group to be backed up based on the source persistent volume object corresponding to the container group.

The source persistent volume object points to the data storage area of the corresponding container group. Therefore, a data storage address of the corresponding container group may be determined according to the source persistent volume object, and the to-be-backed-up data of the container group may be acquired according to the data storage address.

In one embodiment the service cluster instance includes at least one service component, and the service component includes at least one container group.

The step of acquiring to-be-backed-up data of the container group based on the source persistent volume object corresponding to the container group may include:

determining, based on instance address information in the source persistent volume object corresponding to the container group, an instance data storage area of the service cluster instance to which the container group belongs;

determining, based on component address information in the source persistent volume object corresponding to the container group, a component data storage area of the service component to which the container group belongs from the instance data storage area;

determining a data storage area of the container group from the component data storage area according to container group address information in the source persistent volume object corresponding to the container group; and acquiring to-be-backed-up data of the container group from the data storage area.

For each container group, this embodiment may first determine an instance data storage area of a service cluster instance to which the container group belongs, and then further determine a component data storage area of a service component to which the container group belongs, thereby determining a data storage area of the container group. In this way, the data storage area of the container group may be rapidly determined through layer-by-layer progressive query.

105: Back up, for the container group, the target data (i.e., the to-be-backed-up data) of the container group to a storage area pointed by the backup persistent volume object corresponding to the container group according to the backup persistent volume claim corresponding to the container group.

In one embodiment the step of backing up, for the container group, the to-be-backed-up data of the container group to a storage area pointed by the backup persistent volume object corresponding to the container group according to the backup persistent volume claim corresponding to the container group may include:

establishing, for the container group, a binding relationship between the backup persistent volume claim and the backup persistent volume object corresponding to the container group; and backing up the to-be-backed-up data of the container group to the storage area pointed by the backup persistent volume object corresponding to the container group according to the backup persistent volume claim corresponding to the container group and the binding relationship.

The backup persistent volume object corresponding to the backup persistent volume claim may be determined according to the backup persistent volume claim corresponding to the container group and the binding relationship, thereby writing the to-be-backed-up data of the container group stored in the source persistent volume object to the storage area pointed by the backup persistent volume object.

In one embodiment the step of establishing, for each container group, a binding relationship between the backup persistent volume claim and the backup persistent volume object corresponding to the container group may include:

acquiring, for each container group, an object attribute identity of the backup persistent volume object corresponding to the container group; and writing the object attribute identity into configuration information of the backup persistent volume claim corresponding to the container group, so as to establish a binding relationship between the backup persistent volume claim and the backup persistent volume object corresponding to the container group.

The object attribute identity is specifically a unique identity allocated by the service cluster instance backup system for the backup persistent volume object, and the object attribute identity is used for uniquely identifying the backup persistent volume object.

The writing the object attribute identity of the backup persistent volume object into configuration information of the backup persistent volume claim may specifically be: updating binding object information in the configuration information of the backup persistent volume claim into the object attribute identity of the backup persistent volume object.

Figure 1E:
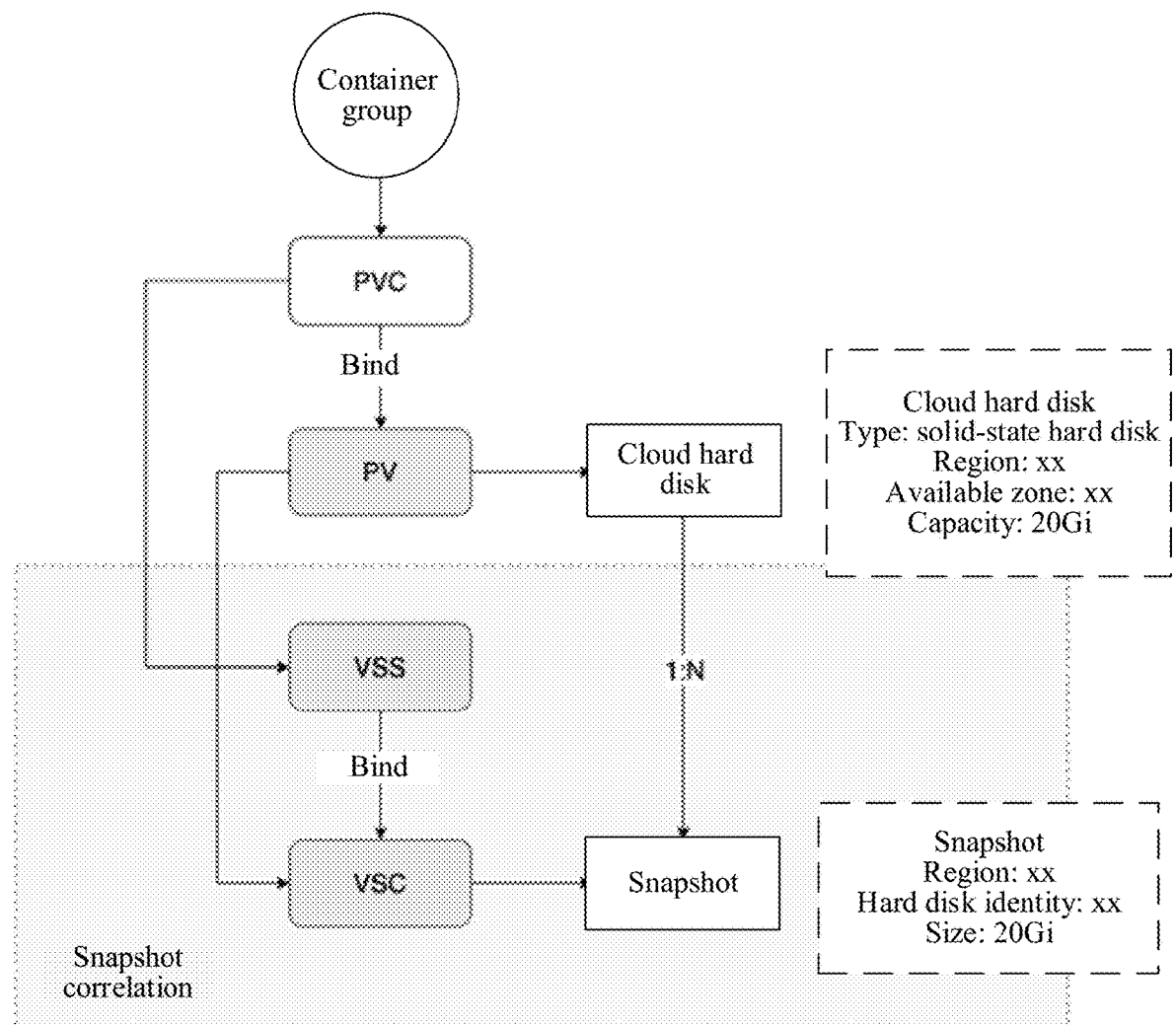
FIG. 1e is another explanatory diagram of service cluster instance backup and recovery methods according to an embodiment of the present disclosure.

In a specific embodiment, when a service periodically initiates a snapshot or a service cluster instance is destroyed and a snapshot is automatically initiated, a VSS/VSC may be created from a PVC/PV respectively by calling related interfaces for each container group, whereby a snapshot is created from a Disk cloud hard disk for underlying storage, where the PVC and the PV, as well as the VSS and the VSC, have an identity document (ID) binding relationship with each other, referring to FIG. 1e.

In some embodiments, a plurality of snapshot requests may be initiated at different time points for the same service cluster instance to generate 1:N snapshots. Each snapshot may be configured to recover a different target instance.

A hard disk identity (Disk-id) of the snapshot represents a source attribute of the snapshot. That is, the snapshot is backed up from the disk cloud hard disk. The snapshot in FIG. 1e may be understood as a storage space, which may specifically represent the storage area pointed by the backup persistent volume object to which the to-be-backed-up data of the container group is backed up.

Specifically, in this embodiment, when the backup triggering condition is satisfied, for each container group of the service cluster instance, a VSS and a VSC corresponding to the container group may be created according to a PVC and a PV corresponding to the container group, and then to-be-backed-up data of the container group in the cloud hard disk is determined based on the PV. Thus, the to-be-backed-up data of the container group is backed up to the storage area pointed by the VSC according to the VSS, so as to realize the migration of the data in the cloud hard disk to the storage area pointed by the VSC in the snapshot.

In one embodiment the service cluster instance backup method may further include:

analyzing a resource reference association relationship of the service cluster instance to determine dependent resources of the service cluster instance; and backing up the dependent resources.

The dependent resources of the service cluster instance may specifically be sub-resources existing in the service cluster instance.

Specifically, in order to meet various management and control requirements of stateful services, a service cluster instance may have various sub-resources, such as Probe (probe), SchedulerPolicy (scheduling policy), and WorkloadConfig (workload configuration). These sub-resources are custom resources definition (CRD) resource objects extended by K8s APIService, which are all necessary for the operation of the service cluster instance. Therefore, when performing snapshot backup of the service cluster instance, besides backing up disk data corresponding to the PVC/PV, all dependent sub-resources need to be snapshot and backed up. CRD is a user-defined resource.

In a specific embodiment, the backup of the sub-resources may utilize the back-end storage of K8s to store metadata related to the sub-resources in etcd. Because K8s APIService supports customizing own etcd back-end storage, extended resources and sub-resource objects may be stored in own etcd back-end cluster by version (such as v1alpha/v1beta), and high availability (HA) across an available zone (AZ) is ensured.

etcd is an open source distributed unified key-value storage, which is used for sharing configuration, service discovery, and scheduling coordination of distributed systems or computer clusters.

Figure 1F:
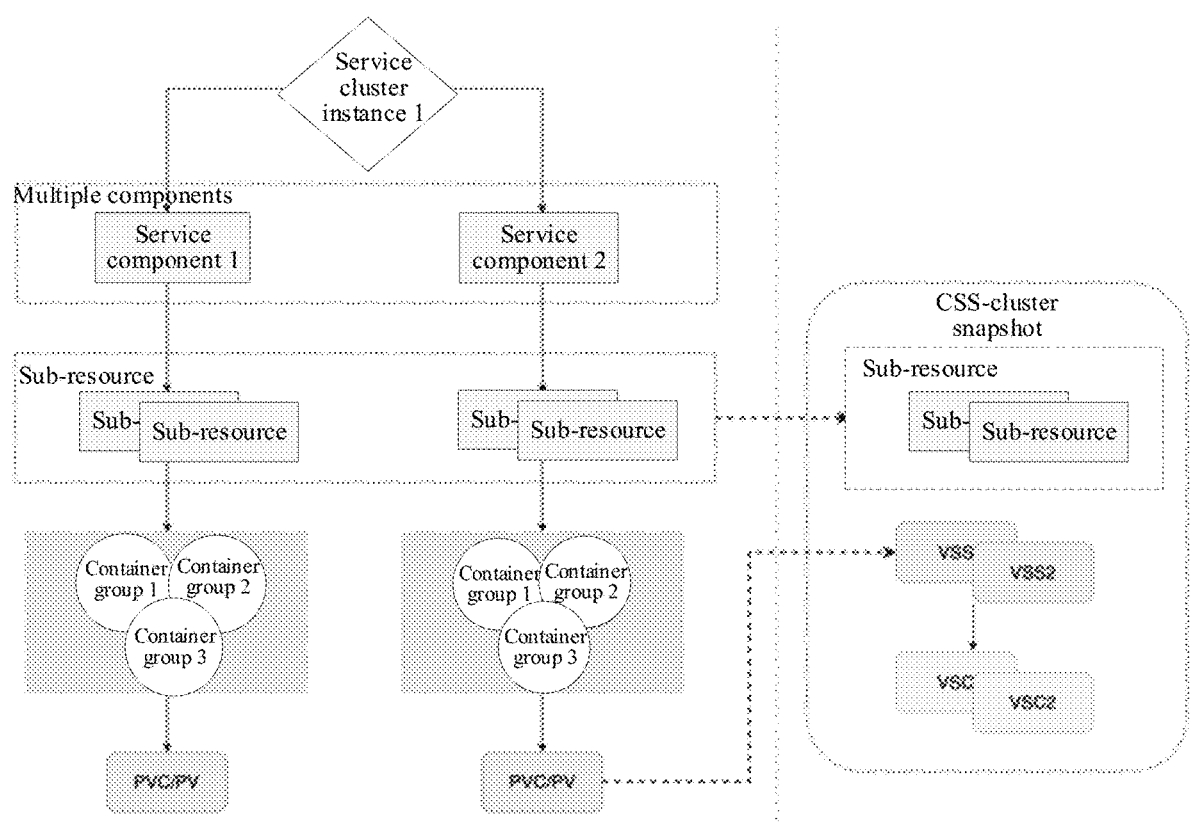
FIG. 1f is another explanatory diagram of service cluster instance backup and recovery methods according to an embodiment of the present disclosure.

As shown in FIG. 1f, when backing up the entire service cluster instance, the VSS/VSC may be created according to the PVC/PV of each container group, and disk data corresponding to the PV may be backed up according to the VSS/VSC. Furthermore, all sub-resource objects (SubResource) on which the service cluster instance depends may be snapshot and backed up. The sub-resource objects are the dependent resources of the service cluster instance. Specifically, in K8s, closely related attributes, methods or operations of a resource may be represented, and separate permission control policies are used.

As can be seen from the above, in this embodiment, a to-be-backed-up service cluster instance may be determined, where the service cluster instance includes at least one container group. For each container group, a source persistent volume claim and a source persistent volume object corresponding to the container group are set, and the container group is stored based on the source persistent volume object, where the source persistent volume claim is configured to claim storage attribute information required by the container group, and the source persistent volume object points to a data storage area of the container group. When the service cluster instance satisfies a backup triggering condition, for each container group, a backup persistent volume claim and a backup persistent volume object corresponding to the container group are created according to the source persistent volume claim and the source persistent volume object corresponding to the container group. For each container group, to-be-backed-up data of the container group is acquired based on the source persistent volume object. For each container group, the to-be-backed-up data of the container group is backed up to a storage area pointed by the backup persistent volume object corresponding to the container group according to the backup persistent volume claim corresponding to the container group, thus realizing data backup of each container group in the service cluster instance. According to the present disclosure, through the foregoing manner, when a service cluster instance is backed up, a corresponding backup persistent volume claim and backup persistent volume object are created for each container group, and to-be-backed-up data of the container group is acquired from a source persistent volume object corresponding to the container group. Then, the to-be-backed-up data of the container group is backed up to a storage area pointing to the backup persistent volume object according to the backup persistent volume claim. In this way, data backup of each container group in the service cluster instance is realized, whereby the entire service cluster instance is backed up, thereby improving the backup efficiency of the service cluster instance, and facilitating rapid backup of the service cluster instance.

This embodiment is described from the perspective of a service cluster instance recovery apparatus. The service cluster instance recovery apparatus may be specifically integrated in a second electronic device. The second electronic device may be a terminal or a server.

Figure 2A:
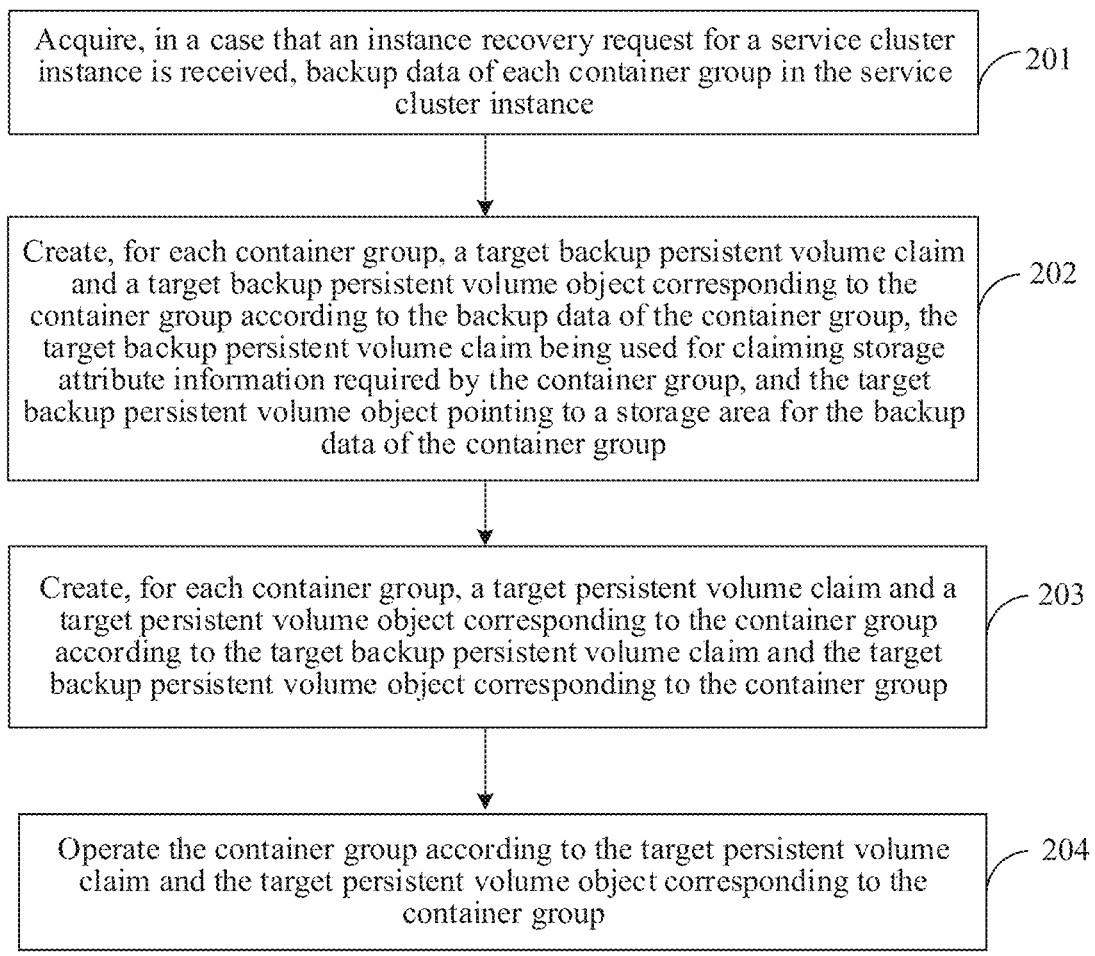
FIG. 2a is another flowchart of service cluster instance backup and recovery methods according to an embodiment of the present disclosure.

As shown in FIG. 2a, a specific procedure of the service cluster instance recovery method is as follows:

201: Acquire, when an instance recovery request for a service cluster instance is received, backup data of each container group in the service cluster instance.

The service cluster instance may be a cluster instance delivered from a stateful service (database), which may be denoted as Cluster. The cluster may be a cluster composed of a plurality of containers. The cluster may be a cluster for container management based on a container orchestration engine Kubernetes (K8s). The container orchestration engine may be configured to manage containerized applications on a plurality of hosts in a cloud platform.

Specifically, the service cluster instance may include at least one service component, and each service component may include at least one container group. The container group may be responsible for the deployment of a service component in the service cluster instance. Each container group may include at least one container. Specifically, a container group (pod) may be a basic scheduling unit of Kubernetes, and a container group pod may include a plurality of service processes.

After a snapshot of the service cluster instance is successfully created, a target instance may be recovered at any time according to the requirements within a validity period of the snapshot, and the data and state of the recovered instance are consistent with those of the previous instance. In addition, a plurality of target instances may be recovered on demand from the same snapshot, and different target instances may be in different namespaces.

In a specific embodiment, the snapshot may be set through a snapshot expiration parameter snapshot-expiration-seconds (which may be accurate to seconds). After a snapshot switch is turned on, if an expiration time is not set, snapshot data may be saved for 7 days by default. During this time, users may rapidly recover a target service cluster instance through snapshots at any time.

202: Create, for each container group, a target backup persistent volume claim and a target backup persistent volume object corresponding to the container group according to the backup data of the container group, the target backup persistent volume claim being configured to claim storage attribute information required by the container group, and the target backup persistent volume object pointing to a storage area for the backup data of the container group.

The target backup persistent volume claim is a persistent volume snapshot claim, which represents an abstract resource object of a persistent volume snapshot, and may be denoted as VSS'. The storage attribute information required by the container group claimed by the target backup persistent volume claim may include a storage capacity, a file system type, and the like. This embodiment is not limited thereto.

The target backup persistent volume object is a persistent volume snapshot content, which represents an abstract resource object of a persistent volume snapshot content and is associated with real back-end snapshot storage resources, such as COS/NFS. The target backup persistent volume object may be denoted as VSC'. The storage area pointed by the target backup persistent volume object stores backup data of the container group, namely snapshot data. The backup data may be abstracted into VSS' and VSC' resource objects in this embodiment.

203: Create, for each container group, a target persistent volume claim and a target persistent volume object corresponding to the container group according to the target backup persistent volume claim and the target backup persistent volume object corresponding to the container group.

The target persistent volume claim may be an application for storage resources, which represents an underlying storage object abstracted for pod use, and claims a required storage capacity (such as 100 G), Node exclusive or shared, file system or block device, or the like, which may be denoted as a persistent volume claim (PVC'). Specifically, PVC' is actually a resource demand application transmitted by users to the kubernetes system.

The target persistent volume object is an abstraction of storage resources, which represents storage abstraction of an underlying hard disk and is associated with a real hard disk. The source persistent volume object may be denoted as a persistent volume (PV'), namely, a persistent volume content.

In one embodiment the backup data of the container group is in a first storage area, and the instance recovery request indicates that the service cluster instance is recovered in a second storage area.

The step of creating, for each container group, a target backup persistent volume claim and a target backup persistent volume object corresponding to the container group according to the backup data of the container group may include:

creating, for each container group, an initial backup persistent volume object and a target backup persistent volume claim in the second storage area according to the backup data of the container group; and updating binding claim information in the initial backup persistent volume object based on the target backup persistent volume claim to obtain a target backup persistent volume object.

The first storage area and the second storage area may be, in particular, storage areas under different NSs. NS is a namespace. Specifically, K8s puts a group of related resources in the same namespace through namespace, so as to achieve the purpose of resource isolation and permission restriction.

Specifically, the service cluster instance may be backed up and recovered in the same NS or in different NSs. When backup and recovery are not in the same NS, binding claim information in an initial backup persistent volume object created based on backup data needs to be updated. Specifically, the binding claim information may be corrected to a target backup persistent volume claim, and an updated target backup persistent volume object may be obtained.

The binding claim information in the initial backup persistent volume object may be a VolumeSnapshotRef parameter field. The VolumeSnapshotRef parameter field is used for referring to a corresponding VolumeSnapshot.

204: Operate the container group according to the target persistent volume claim and the target persistent volume object corresponding to the container group.

In this way, each container group in the service cluster instance is operated according to the target persistent volume claim and the target persistent volume object corresponding to each container group in the service cluster instance, thereby recovering the operation of each container group in the service cluster instance.

In one embodiment the step of operating the container group according to the target persistent volume claim and the target persistent volume object corresponding to the container group may include:

binding the target persistent volume claim and the target persistent volume object corresponding to the container group; and operating the container group when the target persistent volume claim and the target persistent volume object are mutually bound.

In one embodiment the step of binding the target persistent volume claim and the target persistent volume object corresponding to the container group may include:

acquiring an object attribute identity of the target persistent volume object of the container group; and writing the object attribute identity into configuration information of the target persistent volume claim corresponding to the container group, so as to establish a binding relationship between the target persistent volume claim and the target persistent volume object.

The object attribute identity is specifically a unique identity allocated by the service cluster instance recovery system for the target persistent volume object, and the object attribute identity is used for uniquely identifying the target persistent volume object.

The writing the object attribute identity of the target persistent volume object into configuration information of the target persistent volume claim may specifically be: updating binding object information in the configuration information of the target persistent volume claim into the object attribute identity of the target persistent volume object.

Figure 2B:
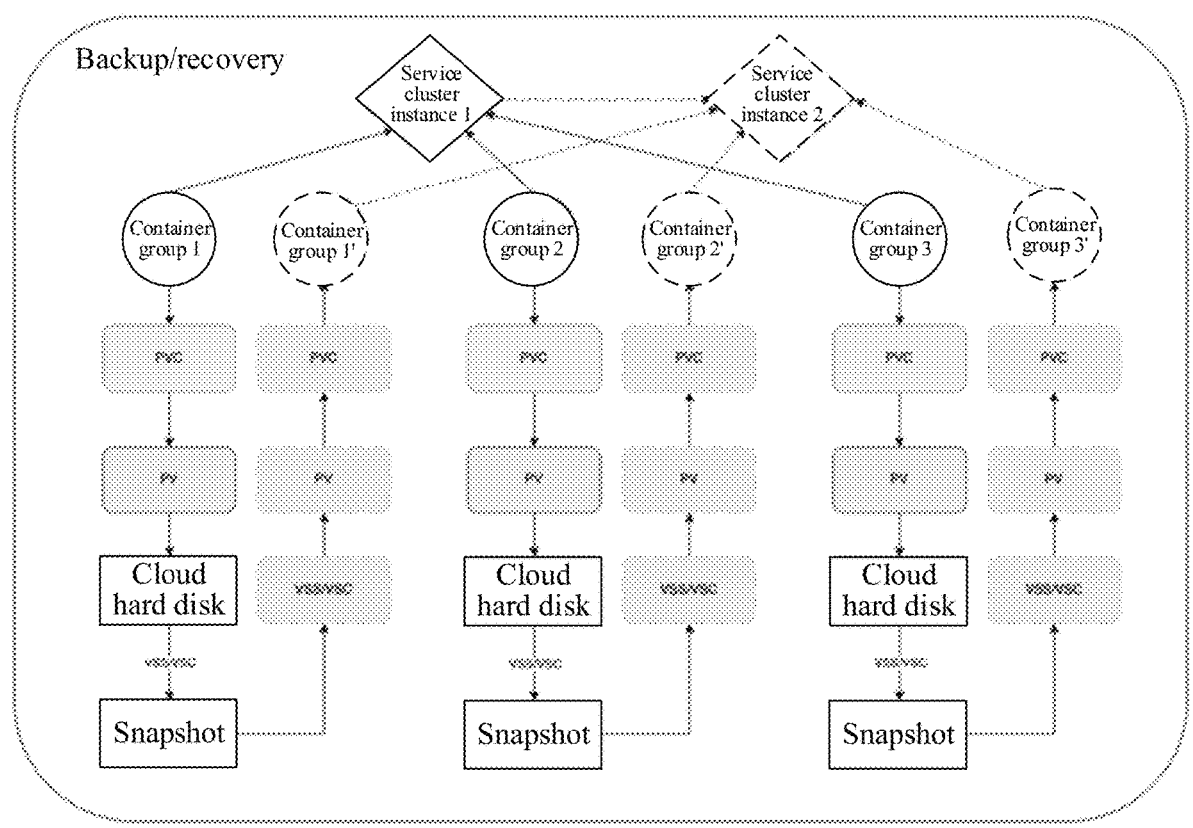
FIG. 2b is another explanatory diagram of service cluster instance backup and recovery methods according to an embodiment of the present disclosure.

In a specific embodiment, as shown in FIG. 2b, the service data recovery procedure starts from a snapshot (specifically, backup data corresponding to service cluster instance 1). For each container group of a to-be-recovered target service cluster instance, VSS' and VSC' resource objects are created based on the backup data of the container group, and the VSS' and VSC' resource objects are bound to each other, and a ReadyToUse state thereof is true. Then, PVC' and PV' are created by using VSS' and VSC' as data sources, and after being mutually bound and in a Bound state, PVC' and PV' may be used by the pod of the target service cluster instance, and the backup data is migrated and copied from a snapshot to a disk hard disk. Further, pod will be operated, and finally, the target service cluster instance is operated normally. The recovered target service cluster instance may be denoted as service cluster instance 2, and the data and state of service cluster instance 2 are consistent with those of the previous service cluster instance 1.

Specifically, the service cluster instance may be backed up and recovered in the same NS or in different NSs. The procedure of backup and recovery within the same NS is shown in FIG. 2b. The service cluster instance backup and recovery methods provided by this embodiment of the present disclosure may also realize the cross-NS recovery of the service cluster instance.

Figure 2C:
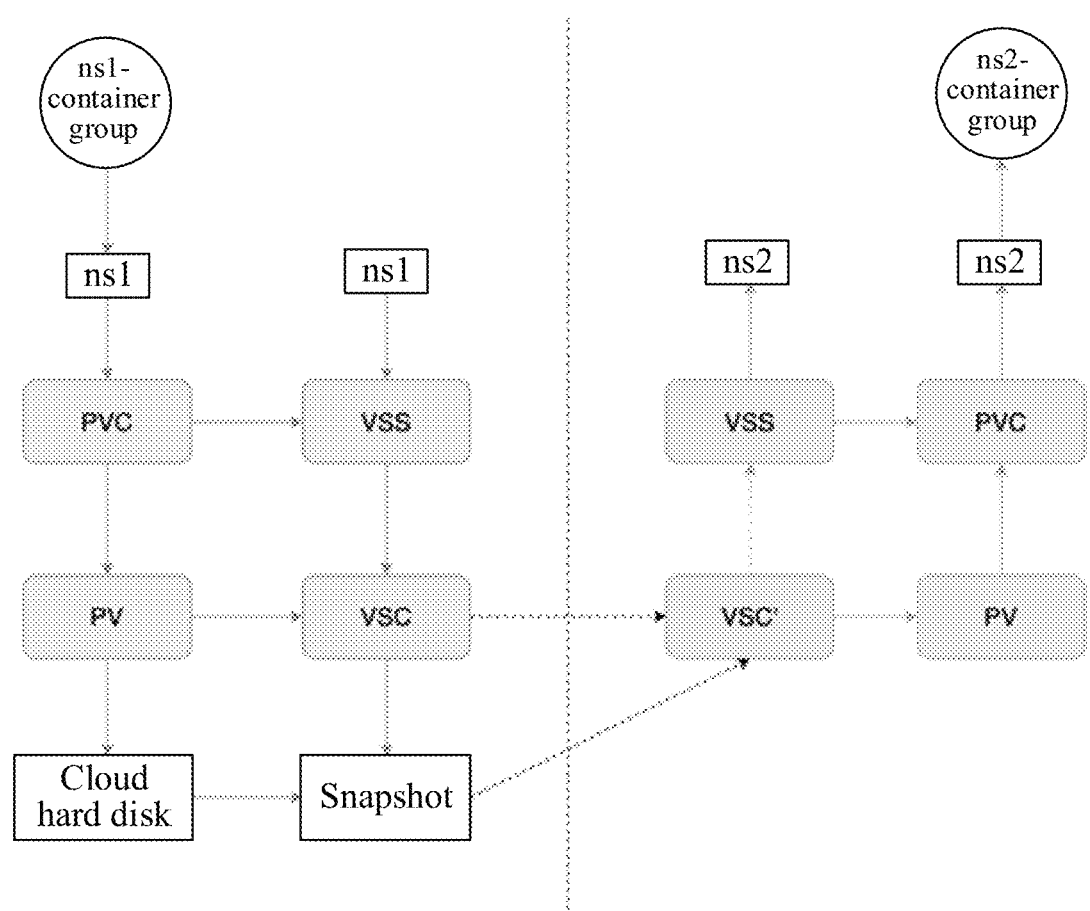
FIG. 2c is another explanatory diagram of service cluster instance backup and recovery methods according to an embodiment of the present disclosure.

For the backup and recovery of different NSs, special logical processing is needed. Referring to FIG. 2c, the backup data (snapshot data) corresponding to the container group is in a storage area ns1, and the instance recovery request indicates recovery in a storage area ns2. The specific implementation is: creating, for each container group of a to-be-recovered target service cluster instance, VSC' based on backup data of the container group; creating VSS' under a target NS (specifically, the storage area ns2); changing VolumeSnapshotRef in VSC' to VSS' under the target NS; and then reconciling, by a K8s internal VSS controller, VSS' and VSC' to be bound to each other, and allowing the state ReadyToUse to be true. Then, PVC' and PV' are created by using VSS' and VSC' as data sources, and after being mutually bound and in a Bound state, PVC' and PV' may be used by the pod of the target service cluster instance. Further, pod will be operated, and finally, the target service cluster instance is operated normally.

The Changes to VolumeSnapshotRef May Include:

vsc.Spec. Volume Snapshot Ref. Name = vss. Get Name ()

vsc.Spec. Volume Snapshot Ref. Name space = vss. Get Name space ()

vsc.Spec. Volume Snapshot Ref.UID = vss. Get UID()

In one embodiment the step of operating the container group according to the target persistent volume claim and the target persistent volume object corresponding to the container group may include:

acquiring backup data corresponding to dependent resources of the service cluster instance; and operating the container group according to the backup data corresponding to the dependent resources, and the target persistent volume claim and the target persistent volume object corresponding to the container group.

The dependent resources of the service cluster instance may specifically be sub-resources existing in the service cluster instance.

In order to meet various management and control requirements of stateful services, a service cluster instance may have various sub-resources, such as Probe (probe), SchedulerPolicy (scheduling policy), and WorkloadConfig (workload configuration). These sub-resources are CRD resource objects extended by K8s APIService, which are all necessary for the operation of the service cluster instance. Therefore, when performing snapshot backup of the service cluster instance, besides backing up disk data corresponding to the PVC/PV, all dependent sub-resources need to be snapshot and backed up. CRD is a user-defined resource.

Specifically, a stateful service instance depends on a plurality of sub-resources. If these sub-resources still depend on underlying persistent volume resources, the sub-resources may be packaged as a whole and uploaded to COS or NFS. Then the packaged and uploaded sub-resource references are saved for backup, which can reduce the complexity of the backup and recovery logic of the whole service cluster instance and improve the efficiency.

Figure 2D:
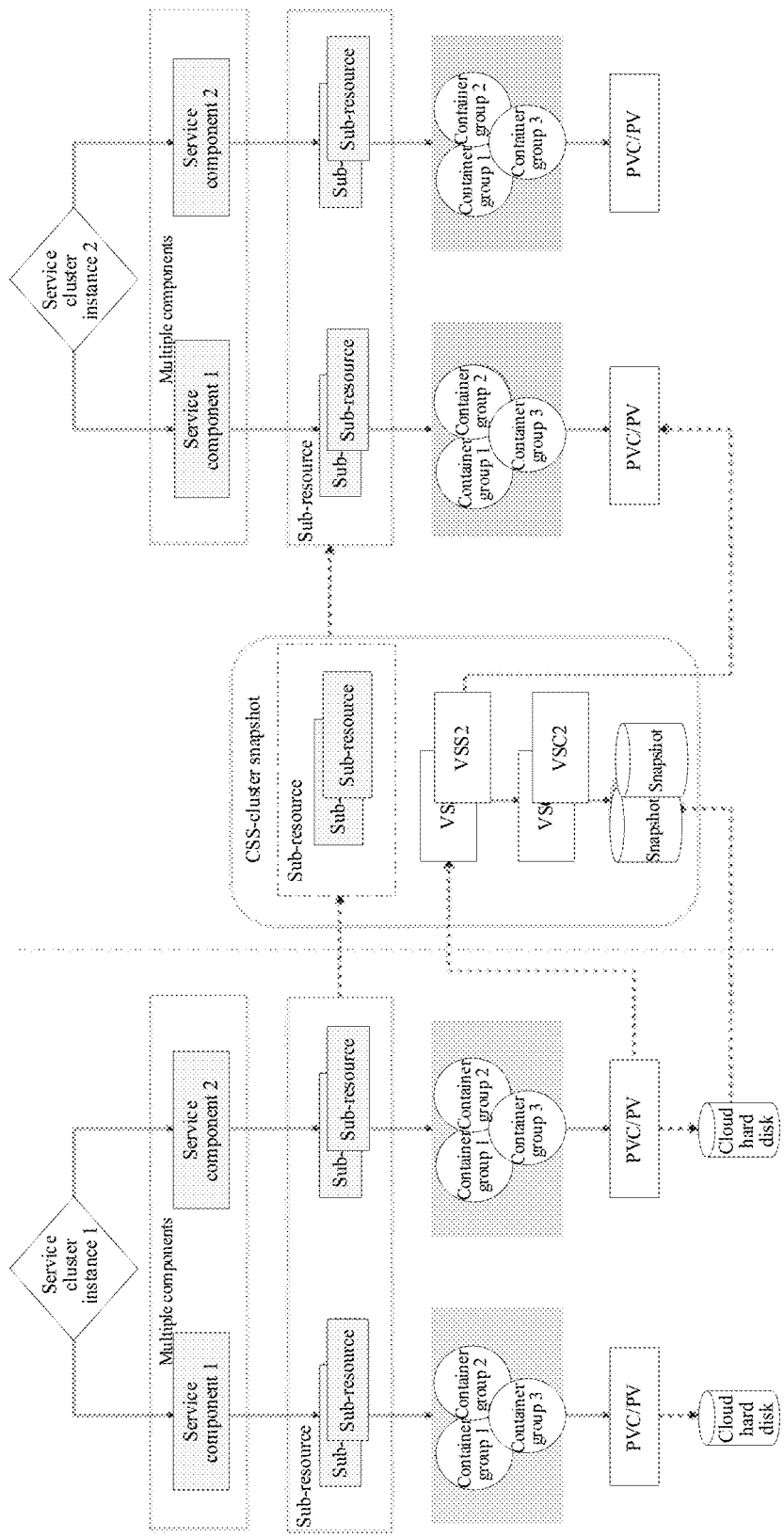
FIG. 2d is another explanatory diagram of service cluster instance backup and recovery methods according to an embodiment of the present disclosure.

Specifically, FIG. 2d shows an overall backup and recovery procedure of a service cluster instance. The process is described as follows:

First, by calling a service delivery interface, a source service cluster instance (denoted as service cluster instance 1, src-cluster1) is created. After service cluster instance 1 is operated normally by instance initialization and data persistence writing, and a snapshot backup request may be initiated through the interface.

At this moment, the back-end will dynamically create a cluster instance snapshot (CSS) resource object according to the Snapshot backup request. Then the resource object is transmitted to a corresponding Snapshot-controller to reconcile. Finally, data backup VSS, VSC, Snapshot (snapshot data), and backup data of sub-resources are created. At this point, the snapshot backup procedure is successful. If the source service cluster instance needs to be deleted at this moment, a garbage collector controller (GC-controller) may safely truly delete the source service cluster instance.

After the backup data is prepared, the service may initiate a request to recover the target service cluster instance at any time according to the demand. The back-end will start from Snapshot (snapshot data), create VSS' and VSC' resource objects of the target instance, and bind the VSS' and VSC' resource objects to each other, and the ReadyToUse state thereof is true. Then, PVC' and PV' are created by using VSS' and VSC' as data sources, and after being mutually bound and in a Bound state, PVC' and PV' may be used by the pod of the target service cluster instance, and the backup data is migrated and copied from a snapshot to a disk cloud hard disk. Further, pod will be operated, and a service component may also be then normally operated. Finally, the target service cluster instance is operated normally. The recovered target service cluster instance may be denoted as service cluster instance 2, and the data and state of service cluster instance 2 are consistent with those of the previous service cluster instance 1.

Cluster snapshot (CSS) is a cluster instance snapshot, and a custom resources definition (CRD) object represents a snapshot abstract entity object of a service cluster instance, including backup related metadata.

From the overall level of a database instance, the present disclosure may rapidly back up and recover a database cluster instance and dependent sub-resources, not only realize the snapshot of the service at any time as demanded, but also provide rapid service at the first time after the service instance is mistakenly deleted, thus ensuring the safety and stability of service data. Furthermore, after users accidentally delete instances, snapshots may be automatically created for backup, including disk persistent volume data and sub-resource metadata, for rapidly recovering service instances.

In addition, the generated snapshots may support a variety of back-end storage, such as COS object storage, NFS, and cloud snapshot, and the cost is much lower than that of an ordinary cloud hard disk. Therefore, significant cost reduction and efficiency improvement can be brought to the service.

In some embodiments, if an interface or procedure exception occurs during snapshot backup, a Snapshot-controller will retry through Exponential Backoff. When snapshot resources are insufficient or the account is in arrears, the retry may fail all the time. When the resources satisfy the conditions or the interface is recovered, a Backoff counter may be reset in an appropriate way to rapidly recover the backup procedure to normal.

Disk snapshotting is a relatively time-consuming process. In this embodiment, besides making snapshots based on Block, snapshots may also be realized based on XFS Reflink, and the efficiency can be further improved.

The present disclosure may provide a rapid backup and recovery system for Kubernetes cluster stateful services, which can realize the rapid backup and recovery of the entire instance and sub-resources of database stateful services, whereby service instances may be rapidly recovered and normally operated. In addition, cross-NS service instance backup and recovery are also supported. When users delete by mistake, the entire instance (including dependent sub-resources) may be automatically backed up to ensure the security and stability of the service.

As can be seen from the above, in this embodiment, when an instance recovery request for a service cluster instance is received, backup data of each container group in the service cluster instance is acquired. For each container group, a target backup persistent volume claim and a target backup persistent volume object corresponding to the container group are created according to the backup data of the container group, where the target backup persistent volume claim is configured to claim storage attribute information required by the container group, and the target backup persistent volume object points to a storage area for the backup data of the container group. For each container group, a target persistent volume claim and a target persistent volume object corresponding to the container group are created according to the target backup persistent volume claim and the target backup persistent volume object corresponding to the container group. The container group is operated according to the target persistent volume claim and the target persistent volume object corresponding to the container group, thus recovering operation of each container group in the service cluster instance. According to the present disclosure, through the foregoing manner, a corresponding target backup persistent volume claim and target backup persistent volume object are created for each container group in a to-be-recovered service cluster instance, and a corresponding target persistent volume claim and target persistent volume object are created according to the target backup persistent volume claim and the target backup persistent volume object. Further, the container group is operated according to the created target persistent volume claim and target persistent volume object. In this way, operation of each container group in the service cluster instance is recovered. That is, the entire service cluster instance is recovered, thereby improving the recovery efficiency of the service cluster instance, and facilitating rapid recovery of the service cluster instance.

Figure 3A:
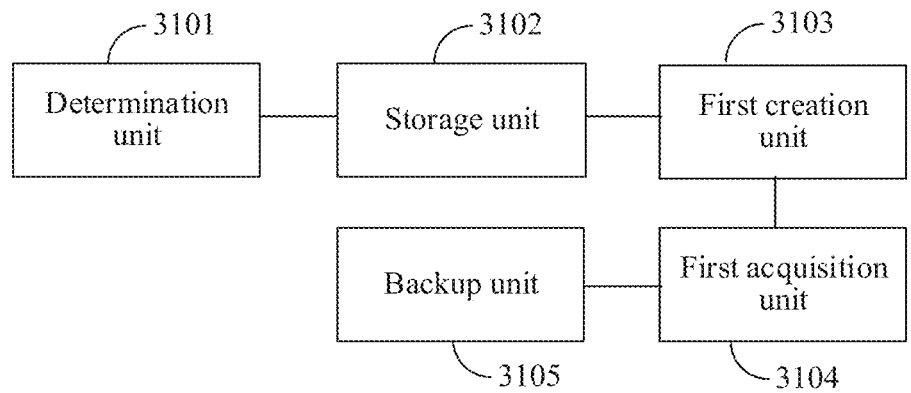
FIG. 3a is a schematic structural diagram of a service cluster instance backup apparatus according to an embodiment of the present disclosure.
Figure 3B:
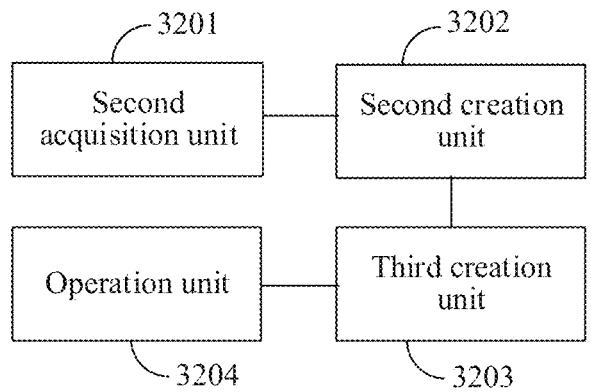
FIG. 3b is a schematic structural diagram of a service cluster instance recovery apparatus according to an embodiment of the present disclosure.

In order to better implement the above method, this embodiment of the present disclosure also provides a service cluster instance backup and recovery system. The service cluster instance backup and recovery system includes a service cluster instance backup apparatus 31 and a service cluster instance recovery apparatus 32. As shown in FIG. 3a, the service cluster instance backup apparatus 31 may include a determination unit 3101, a storage unit 3102, a first creation unit 3103, a first acquisition unit 3104, and a backup unit 3105. As shown in FIG. 3b, the service cluster instance recovery apparatus 32 may include a second acquisition unit 3201, a second creation unit 3202, a third creation unit 3203, and an operation unit 3204.

A. Service Cluster Instance Backup Apparatus 31

(1) Determination Unit 3101

The determination unit is configured to determine a to-be-backed-up service cluster instance. The service cluster instance includes at least one container group.

(2) Storage Unit 3102

The storage unit is configured to set, for each container group, a source persistent volume claim and a source persistent volume object corresponding to the container group, and store the container group based on the source persistent volume object. The source persistent volume claim is configured to claim storage attribute information required by the container group. The source persistent volume object points to a data storage area of the container group.

In some embodiments of the present disclosure, the storage unit may include a setting subunit, a set acquisition subunit, an establishment subunit, and a storage subunit.

The setting subunit is configured to set, for each container group, a source persistent volume claim corresponding to the container group. The source persistent volume claim includes a storage capacity and a file system type required by the container group.

The establishment subunit is configured to select a persistent volume object matching the storage capacity and the file system type from a persistent volume object set currently in an available state as a source persistent volume object corresponding to the container group, and establish a binding relationship between the selected source persistent volume object and the source persistent volume claim.

The storage subunit is configured to store data of the container group to the data storage area pointed by the source persistent volume object according to the source persistent volume claim and the binding relationship.

(3) First Creation Unit 3103

The first creation unit is configured to create, for each container group, a backup persistent volume claim and a backup persistent volume object corresponding to the container group according to the source persistent volume claim and the source persistent volume object corresponding to the container group when the service cluster instance satisfies a backup triggering condition.

In some embodiments of the present disclosure, the first creation unit may be specifically configured to create, for each container group, a backup persistent volume claim and a backup persistent volume object corresponding to the container group according to the source persistent volume claim and the source persistent volume object corresponding to the container group in response to that the service cluster instance is deleted and in a backup starting state.

In some embodiments of the present disclosure, the first creation unit may be specifically configured to create, for each container group, a backup persistent volume claim and a backup persistent volume object corresponding to the container group according to the source persistent volume claim and the source persistent volume object corresponding to the container group when a current time satisfies a backup triggering time condition of the service cluster instance.

(4) First Acquisition Unit 3104

The first acquisition unit is configured to acquire, for each container group, to-be-backed-up data of the container group based on the source persistent volume object corresponding to the container group.

In some embodiments of the present disclosure, the service cluster instance includes at least one service component, and the service component includes at least one container group.

The first acquisition unit may include a first determination subunit, a second determination subunit, a third determination subunit, and a data acquisition subunit.

The first determination subunit is configured to determine, based on instance address information in the source persistent volume object corresponding to the container group, an instance data storage area of the service cluster instance to which the container group belongs.

The second determination subunit is configured to determine, based on component address information in the source persistent volume object corresponding to the container group, a component data storage area of the service component to which the container group belongs from the instance data storage area.

The third determination subunit is configured to determine a data storage area of the container group from the component data storage area according to container group address information in the source persistent volume object corresponding to the container group.

The data acquisition subunit is configured to acquire to-be-backed-up data of the container group from the data storage area.

(5) Backup Unit 3105

The backup unit is configured to back up, for each container group, the to-be-backed-up data of the container group to a storage area pointed by the backup persistent volume object corresponding to the container group according to the backup persistent volume claim corresponding to the container group.

In some embodiments of the present disclosure, the backup unit may include a first binding subunit and a backup subunit.

The first binding subunit is configured to establish, for each container group, a binding relationship between the backup persistent volume claim and the backup persistent volume object corresponding to the container group.

The backup subunit is configured to back up the to-be-backed-up data of the container group to the storage area pointed by the backup persistent volume object corresponding to the container group according to the backup persistent volume claim corresponding to the container group and the binding relationship.

In some embodiments of the present disclosure, the first binding subunit may be specifically configured to acquire, for each container group, an object attribute identity of the backup persistent volume object corresponding to the container group, and write the object attribute identity into configuration information of the backup persistent volume claim corresponding to the container group, so as to establish a binding relationship between the backup persistent volume claim and the backup persistent volume object corresponding to the container group.

In some embodiments of the present disclosure, the service cluster instance backup apparatus may further include a dependent resource backup unit.

The dependent resource backup unit is configured to analyze a resource reference association relationship of the service cluster instance to determine dependent resources of the service cluster instance, and back up the dependent resources.

B. Service Cluster Instance Recovery Apparatus 32

(6) Second Acquisition Unit 3201

The second acquisition unit is configured to acquire, when an instance recovery request for a service cluster instance is received, backup data of each container group in the service cluster instance.

(7) Second Creation Unit 3202

The second creation unit is configured to create, for each container group, a target backup persistent volume claim and a target backup persistent volume object corresponding to the container group according to the backup data of the container group. The target backup persistent volume claim is configured to claim storage attribute information required by the container group. The target backup persistent volume object points to a storage area for the backup data of the container group.

In some embodiments of the present disclosure, the backup data of the container group is in a first storage area, and the instance recovery request indicates that the service cluster instance is recovered in a second storage area.

The second creation unit may include a creation subunit and an update subunit.

The creation subunit is configured to create, for each container group, an initial backup persistent volume object and a target backup persistent volume claim in the second storage area according to the backup data of the container group.

The update subunit is configured to update binding claim information in the initial backup persistent volume object based on the target backup persistent volume claim to obtain a target backup persistent volume object corresponding to the container group.

(8) Third Creation Unit 3203

The third creation unit is configured to create, for each container group, a target persistent volume claim and a target persistent volume object corresponding to the container group according to the target backup persistent volume claim and the target backup persistent volume object corresponding to the container group.

(9) Operation Unit 3204

The operation unit is configured to operate the container group according to the target persistent volume claim and the target persistent volume object corresponding to the container group.

In some embodiments of the present disclosure, the operation unit may include a second binding subunit and an operation subunit.

The second binding subunit is configured to bind the target persistent volume claim and the target persistent volume object corresponding to the container group.

The operation subunit is configured to operate the container group when the target persistent volume claim and the target persistent volume object are mutually bound.

In some embodiments of the present disclosure, the second binding subunit may be specifically configured to acquire an object attribute identity of the target persistent volume object of the container group, and write the object attribute identity into configuration information of the target persistent volume claim corresponding to the container group, so as to establish a binding relationship between the target persistent volume claim and the target persistent volume object.

In some embodiments of the present disclosure, the operation unit may include a dependent resource acquisition subunit and an instance operation subunit.

The dependent resource acquisition subunit is configured to acquire backup data corresponding to dependent resources of the service cluster instance.

The instance operation subunit is configured to operate the container group according to the backup data corresponding to the dependent resources, and the target persistent volume claim and the target persistent volume object corresponding to the container group.

As can be seen from the above, in this embodiment, the determination unit 3101 determines a to-be-backed-up service cluster instance, where the service cluster instance includes at least one container group. For each container group, the storage unit 3102 sets a source persistent volume claim and a source persistent volume object corresponding to the container group, and stores the container group based on the source persistent volume object, where the source persistent volume claim is configured to claim storage attribute information required by the container group, and the source persistent volume object points to a data storage area of the container group. When the service cluster instance satisfies a backup triggering condition, for each container group, the first creation unit 3103 creates a backup persistent volume claim and a backup persistent volume object corresponding to the container group according to the source persistent volume claim and the source persistent volume object corresponding to the container group. The first acquisition unit 3104 acquires to-be-backed-up data of the container group based on the source persistent volume object. For each container group, the backup unit 3105 backs up the to-be-backed-up data of the container group to a storage area pointed by the backup persistent volume object corresponding to the container group according to the backup persistent volume claim corresponding to the container group, so as to realize data backup of each container group in the service cluster instance.

Alternatively, when an instance recovery request for a service cluster instance is received, the second acquisition unit 3201 acquires backup data of each container group in the service cluster instance. For each container group, the second creation unit 3202 creates a target backup persistent volume claim and a target backup persistent volume object corresponding to the container group according to the backup data of the container group, where the target backup persistent volume claim is configured to claim storage attribute information required by the container group, and the target backup persistent volume object points to a storage area for the backup data of the container group. The third creation unit 3203 creates a target persistent volume claim and a target persistent volume object corresponding to the container group according to the target backup persistent volume claim and the target backup persistent volume object. The operation unit 3204 operates the container group according to the target persistent volume claim and the target persistent volume object corresponding to the container group, so as to recover operation of each container group in the service cluster instance.

According to the present disclosure, the entire service cluster instance may be backed up and recovered, thereby improving the backup efficiency and recovery efficiency of the service cluster instance, and facilitating rapid backup and recovery of the service cluster instance.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 4:
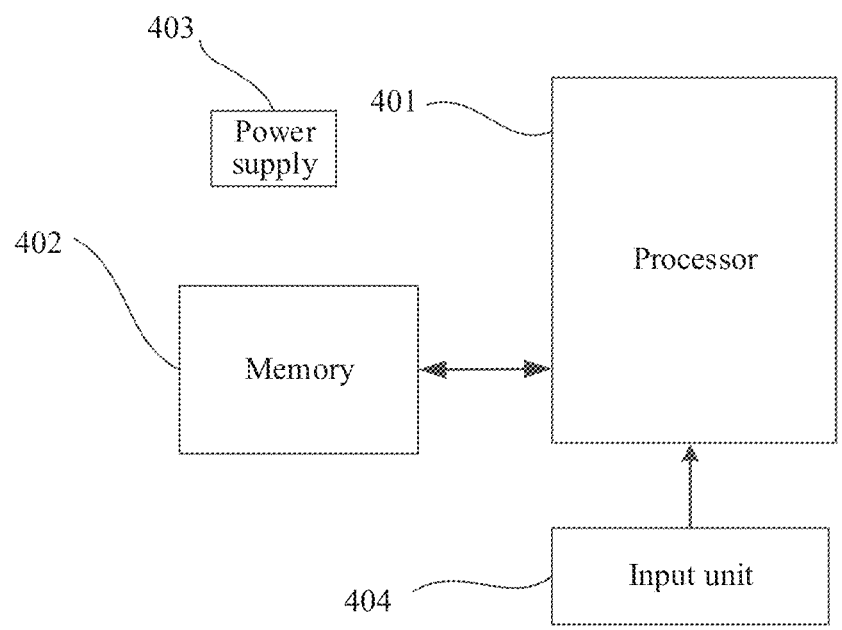
FIG. 4 is a schematic structural diagram of an electronic device according to an embodiment of the present disclosure.

This embodiment of the present disclosure further provides an electronic device. FIG. 4 shows a schematic structural diagram of an electronic device according to an embodiment of the present disclosure. The electronic device may be a terminal or a server. Specifically:

The electronic device may include components such as a processor 401 of one or more processing cores, a memory 402 of one or more computer-readable storage media, a power supply 403, and an input unit 404. A person skilled in the art may understand that the electronic device structure shown in FIG. 4 does not constitute a limit to the electronic device. The electronic device may include more or fewer parts than those shown in the figure, may combine some parts, or may have different part arrangements.

The processor 401 is a control center of the electronic device, which is connected to various parts of the entire electronic device by using various interfaces and lines, and by running or executing a software program and/or module stored in the memory 402 and calling data stored in the memory 402, to implement various functions of the electronic device and process data. In some embodiments, the processor 401 may include one or more processing cores. In one embodiment, the processor 401 may integrate an application processor and a modem. The application processor mainly processes an operating system, a user interface, an application, and the like. The modem mainly processes wireless communication. The foregoing modem may not be integrated into the processor 401.

The memory 402 may be configured to store a software program and module. The processor 401 runs the software program and module stored in the memory 402, to implement various functional applications and data processing. The memory 402 may mainly include a program storage area and a data storage area. The program storage area may store an operating system, an application required by at least one function (such as a sound playing function and an image display function), and the like. The data storage area may store data created according to use of the electronic device, and the like. Furthermore, the memory 402 may include a high speed random access memory, and may further include a non-volatile memory, such as at least one disk storage device, a flash memory, or another volatile solid-state storage device. Correspondingly, the memory 402 may further include a memory controller, to provide access of the processor 401 to the memory 402.

The electronic device further includes the power supply 403 for supplying power to the components. In one embodiment, the power supply 403 may be logically connected to the processor 401 by using a power supply management system, thereby implementing functions, such as charging, discharging, and power consumption management, by using the power supply management system. The power supply 403 may further include one or more of a direct current or alternating current power supply, a re-charging system, a power failure detection circuit, a power supply converter or inverter, a power supply state indicator, and any other components.

The electronic device may further include the input unit 404. The input unit 404 may be configured to receive entered numeric or character information and generate keyboard, mouse, joystick, optical, or trackball signal input related to user settings and function control.

Although not shown in the figure, the electronic device may further include a display unit, and the like. Details are not described herein again. Specifically, in this embodiment, the processor 401 in the electronic device loads one or more executable files corresponding to processes of one or more applications into the memory 402 according to the following instructions, and the processor 401 runs the applications stored in the memory 402 to implement various functions. Specifically, operations in the service cluster instance backup and recovery methods provided by this embodiment of the present disclosure may be realized.

For specific implementations of the above operations, reference may be made to the foregoing embodiments. Details are not described herein again.

It will be appreciated by a person of ordinary skill in the art that, all or some steps of various methods in the embodiments may be implemented through instructions, or implemented through instructions controlling relevant hardware, and the instructions may be stored in a computer-readable storage medium and loaded and executed by a processor.

Accordingly, this embodiment of the present disclosure provides a computer-readable storage medium, storing a plurality of instructions. The instructions are suitable to be loaded by the processor, to perform the steps of any of the service cluster instance backup and recovery methods provided by this embodiment of the present disclosure.

For specific implementations of the above operations, reference may be made to the foregoing embodiments. Details are not described herein again.

The computer-readable storage medium may include: a read only memory (ROM), a random access memory (RAM), a disk, an optical disc, or the like.

Since the instructions stored in the computer-readable storage medium may perform the steps of any of the service cluster instance backup and recovery methods provided by this embodiment of the present disclosure, advantageous effects that may be implemented by any of the service cluster instance backup and recovery methods provided by this embodiment of the present disclosure can be achieved. The foregoing embodiments may be referred to for details. Details are not further described herein.

According to an aspect of the present disclosure, a computer program product or computer program is provided. The computer program product or computer program includes computer instructions. The computer instructions are stored in a computer-readable storage medium. A processor of a computer device reads the computer instructions from the computer-readable storage medium. The processor executes the computer instructions, whereby the computer device performs the methods provided in various example implementations of the foregoing service cluster instance backup and recovery aspects.

The service cluster instance backup and recovery methods and related devices provided by this embodiment of the present disclosure are described in detail above. The principle and implementations of the present disclosure are described herein by using specific examples. The descriptions of the foregoing embodiments are merely used for helping understand the method and core ideas of the present disclosure. In addition, a person skilled in the art can make variations to the present disclosure in terms of the specific implementations and application scopes according to the ideas of the present disclosure. Therefore, the content of this specification shall not be construed as a limit on the present disclosure.

What is claimed is:

1. A service cluster instance backup method, performed by an electronic device, the method comprising:
   determining a service cluster instance, the service cluster instance comprising at least one container group; for one container group in the service cluster instance:
   setting a source persistent volume claim and a source persistent volume object corresponding to the container group, and storing the container group based on the source persistent volume object, the source persistent volume claim claiming storage attribute information required by the container group, and the source persistent volume object pointing to a data storage area of the container group;
   creating a backup persistent volume claim and a backup persistent volume object corresponding to the container group according to the source persistent volume claim and the source persistent volume object corresponding to the container group when the service cluster instance satisfies a backup triggering condition;

acquiring target data of the container group to be backed up based on the source persistent volume object corresponding to the container group; and backing up, the target data of the container group to a storage area pointed by the backup persistent volume object corresponding to the container group according to the backup persistent volume claim corresponding to the container group.

2. The method according to claim 1, wherein the backing up the target data of the container group to a storage area pointed by the backup persistent volume object corresponding to the container group according to the backup persistent volume claim corresponding to the container group comprises:

establishing a binding relationship between the backup persistent volume claim and the backup persistent volume object corresponding to the container group; and backing up the target data of the container group to the storage area pointed by the backup persistent volume object corresponding to the container group according to the backup persistent volume claim corresponding to the container group and the binding relationship.

3. The method according to claim 2, wherein the establishing a binding relationship between the backup persistent volume claim and the backup persistent volume object corresponding to the container group comprises:

acquiring an object attribute identity of the backup persistent volume object corresponding to the container group, and writing the object attribute identity into configuration information of the backup persistent volume claim corresponding to the container group, so as to establish the binding relationship between the backup persistent volume claim and the backup persistent volume object corresponding to the container group.

4. The method according to claim 1, wherein the setting a source persistent volume claim and a source persistent volume object corresponding to the container group and storing the container group based on the source persistent volume object comprises:

setting a source persistent volume claim corresponding to the container group, the source persistent volume claim comprising a storage capacity and a file system type required by the container group;

selecting a persistent volume object matching the storage capacity and the file system type from a persistent volume object set currently in an available state, and establishing a binding relationship between the selected persistent volume object and the source persistent volume claim; and storing data of the container group to the data storage area pointed by the source persistent volume object according to the persistent volume claim and the binding relationship.

5. The method according to claim 1, wherein the service cluster instance comprises at least one service component, and the at least one service component comprises at least one container group; and the acquiring target data of the container group based on the source persistent volume object corresponding to the container group comprises:

determining, based on instance address information in the source persistent volume object corresponding to the container group, an instance data storage area of the service cluster instance to which the container group belongs;

determining, based on component address information in the source persistent volume object corresponding to the container group, a component data storage area of the at least one service component to which the container group belongs from the instance data storage area;

determining a data storage area of the container group from the component data storage area according to container group address information in the source persistent volume object corresponding to the container group; and acquiring the target data of the container group from the data storage area.

6. The method according to claim 1, further comprising:

analyzing a resource reference association relationship of the service cluster instance to determine dependent resources of the service cluster instance; and backing up the dependent resources.

7. The method according to claim 1, wherein the creating a backup persistent volume claim and a backup persistent volume object corresponding to the container group according to the source persistent volume claim and the source persistent volume object corresponding to the container group when the service cluster instance satisfies a backup triggering condition comprises:

creating a backup persistent volume claim and a backup persistent volume object corresponding to the container group according to the source persistent volume claim and the source persistent volume object corresponding to the container group in response to that the service cluster instance is deleted and in a backup starting state.

8. The method according to claim 1, wherein the creating a backup persistent volume claim and a backup persistent volume object corresponding to the container group according to the source persistent volume claim and the source persistent volume object corresponding to the container group when the service cluster instance satisfies a backup triggering condition comprises:

creating a backup persistent volume claim and a backup persistent volume object corresponding to the container group according to the source persistent volume claim and the source persistent volume object corresponding to the container group when a current time satisfies a backup triggering time condition of the service cluster instance.

9. A service cluster instance recovery method, performed by an electronic device, the method comprising:

acquiring, when an instance recovery request for a service cluster instance is received, backup data of a container group in the service cluster instance;

creating a target backup persistent volume claim and a target backup persistent volume object corresponding to the container group according to the backup data of the container group, the target backup persistent volume claim claiming storage attribute information required by the container group, and the target backup persistent volume object pointing to a storage area for the backup data of the container group;

creating a target persistent volume claim and a target persistent volume object corresponding to the container group according to the target backup persistent volume claim and the target backup persistent volume object corresponding to the container group; and operating the container group according to the target persistent volume claim and the target persistent volume object corresponding to the container group.

10. The method according to claim 9, wherein the operating the container group according to the target persistent volume claim and the target persistent volume object corresponding to the container group comprises:
- binding the target persistent volume claim and the target persistent volume object corresponding to the container group; and
- operating the container group when the target persistent volume claim and the target persistent volume object are mutually bound.

11. The method according to claim 10, wherein the binding the target persistent volume claim and the target persistent volume object corresponding to the container group comprises:
- acquiring an object attribute identity of the target persistent volume object of the container group; and
- writing the object attribute identity into configuration information of the target persistent volume claim corresponding to the container group, so as to establish a binding relationship between the target persistent volume claim and the target persistent volume object.

12. The method according to claim 9, wherein the backup data of the container group is in a first storage area, and the instance recovery request indicates that the service cluster instance is recovered in a second storage area; and
the creating a target backup persistent volume claim and a target backup persistent volume object corresponding to the container group according to the backup data of the container group comprises:
- creating an initial backup persistent volume object and a target backup persistent volume claim in the second storage area according to the backup data of the container group; and
- updating binding claim information in the initial backup persistent volume object based on the target backup persistent volume claim to obtain a target backup persistent volume object corresponding to the container group.

13. The method according to claim 9, wherein the operating the container group according to the target persistent volume claim and the target persistent volume object corresponding to the container group comprises:
- acquiring backup data corresponding to dependent resources of the service cluster instance; and
- operating the container group according to the backup data corresponding to the dependent resources, and the target persistent volume claim and the target persistent volume object corresponding to the container group.

14. A non-transitory computer-readable storage medium storing a plurality of instructions, the instructions, when being loaded by at least one processor, causing the at least one processor to perform:
- determining a service cluster instance, the service cluster instance comprising at least one container group; for one container group in the service cluster instance:
- setting a source persistent volume claim and a source persistent volume object corresponding to the container group, and storing the container group based on the source persistent volume object, the source persistent volume claim claiming storage attribute information required by the container group, and the source persistent volume object pointing to a data storage area of the container group;
- creating, for the container group, a backup persistent volume claim and a backup persistent volume object corresponding to the container group according to the source persistent volume claim and the source persistent volume object corresponding to the container group when the service cluster instance satisfies a backup triggering condition;
- acquiring, for the container group, target data of the container group to be backed up based on the source persistent volume object corresponding to the container group; and
- backing up, for the container group, the target data of the container group to a storage area pointed by the backup persistent volume object corresponding to the container group according to the backup persistent volume claim corresponding to the container group.

15. The storage medium according to claim 14, wherein the backing up the target data of the container group to a storage area pointed by the backup persistent volume object corresponding to the container group according to the backup persistent volume claim corresponding to the container group comprises:
- establishing a binding relationship between the backup persistent volume claim and the backup persistent volume object corresponding to the container group; and
- backing up the target data of the container group to the storage area pointed by the backup persistent volume object corresponding to the container group according to the backup persistent volume claim corresponding to the container group and the binding relationship.

16. The storage medium according to claim 15, wherein the establishing a binding relationship between the backup persistent volume claim and the backup persistent volume object corresponding to the container group comprises:
- acquiring an object attribute identity of the backup persistent volume object corresponding to the container group, and writing the object attribute identity into configuration information of the backup persistent volume claim corresponding to the container group, so as to establish the binding relationship between the backup persistent volume claim and the backup persistent volume object corresponding to the container group.

17. The storage medium according to claim 14, wherein the setting a source persistent volume claim and a source persistent volume object corresponding to the container group and storing the container group based on the source persistent volume object comprises:
- setting a source persistent volume claim corresponding to the container group, the source persistent volume claim comprising a storage capacity and a file system type required by the container group;
- selecting a persistent volume object matching the storage capacity and the file system type from a persistent volume object set currently in an available state, and establishing a binding relationship between the selected persistent volume object and the source persistent volume claim; and
- storing data of the container group to the data storage area pointed by the source persistent volume object according to the source persistent volume claim and the binding relationship.

18. The storage medium according to claim 14, wherein the service cluster instance comprises at least one service component, and the at least one service component comprises at least one container group; and
the acquiring target data of the container group based on the source persistent volume object corresponding to the container group comprises:

determining, based on instance address information in the source persistent volume object corresponding to the container group, an instance data storage area of the service cluster instance to which the container group belongs;

determining, based on component address information in the source persistent volume object corresponding to the container group, a component data storage area of the at least one service component to which the container group belongs from the instance data storage area;

determining a data storage area of the container group from the component data storage area according to container group address information in the source persistent volume object corresponding to the container group; and acquiring the target data of the container group from the data storage area.

19. The storage medium according to claim 14, wherein the creating a backup persistent volume claim and a backup persistent volume object corresponding to the container group according to the source persistent volume claim and the source persistent volume object corresponding to the container group when the service cluster instance satisfies a backup triggering condition comprises:

creating a backup persistent volume claim and a backup persistent volume object corresponding to the container group according to the source persistent volume claim and the source persistent volume object corresponding to the container group in response to that the service cluster instance is deleted and in a backup starting state.

20. The storage medium according to claim 14, wherein the creating a backup persistent volume claim and a backup persistent volume object corresponding to the container group according to the source persistent volume claim and the source persistent volume object corresponding to the container group when the service cluster instance satisfies a backup triggering condition comprises:

creating a backup persistent volume claim and a backup persistent volume object corresponding to the container group according to the source persistent volume claim and the source persistent volume object corresponding to the container group when a current time satisfies a backup triggering time condition of the service cluster instance.

* * * * *